United States Patent [19]
Kaplan

[11] Patent Number: 5,560,037
[45] Date of Patent: Sep. 24, 1996

[54] COMPACT HYPHENATION POINT DATA

[75] Inventor: Ronald M. Kaplan, Palo Alto, Calif.

[73] Assignee: Xerox Corporation, Stamford, Conn.

[21] Appl. No.: 420,397

[22] Filed: Apr. 10, 1995

Related U.S. Application Data

[63] Continuation of Ser. No. 739,798, Aug. 1, 1991, abandoned, which is a continuation of Ser. No. 478,043, Feb. 6, 1990, abandoned, which is a continuation of Ser. No. 138,543, Dec. 28, 1987, abandoned.

[51] Int. Cl.⁶ .................................................. G06F 15/00
[52] U.S. Cl. ................... 395/800; 395/600; 364/419.06; 364/225.7; 364/DIG. 1
[58] Field of Search ................................. 395/800, 600; 364/419.06, 225.7, DIG. 1

[56] References Cited

U.S. PATENT DOCUMENTS

| | | | |
|---|---|---|---|
| 3,459,341 | 4/1969 | Dolby et al. | 340/172.5 |
| 3,533,076 | 10/1970 | Damerau | 340/172.5 |
| 4,028,677 | 6/1977 | Rosenbaum | 340/172.5 |
| 4,092,729 | 5/1978 | Rosenbaum et al. | 364/200 |
| 4,181,972 | 1/1980 | Casey | 364/900 |
| 4,456,969 | 6/1984 | Herzik et al. | 364/900 |
| 4,574,363 | 3/1986 | Carlgren et al. | 364/900 |
| 4,580,241 | 4/1986 | Kucera | 364/900 |
| 4,597,057 | 6/1986 | Snow | 364/900 |
| 4,758,955 | 7/1988 | Chen | 364/419 |
| 4,771,401 | 9/1988 | Kaufman et al. | 364/300 |
| 4,775,956 | 10/1988 | Kaji et al. | 364/419 |
| 4,777,617 | 10/1988 | Frisch et al. | 364/900 |
| 4,807,905 | 2/1989 | Reagan | 281/15 |
| 4,873,634 | 10/1989 | Frisch et al. | 364/419 |
| 4,974,195 | 11/1990 | Amari et al. | 364/900 |
| 5,450,598 | 9/1995 | Kaplan et al. | 395/800 |
| 5,488,719 | 1/1996 | Kaplan et al. | 395/600 |

FOREIGN PATENT DOCUMENTS

| | | | |
|---|---|---|---|
| 83393 | 7/1983 | European Pat. Off. | 364/419 |
| 222957 | 11/1985 | Japan | 364/419 |
| 8501814 | 4/1985 | WIPO | G06F 9/36 |

OTHER PUBLICATIONS

Liang, F. M., Word Hy–Phen–A–Tion By Com–Put–Er, Ph.D Thesis, Stanford University, Dept. of Computer Science, Jun. 1983.

Carlgren, R. G., "Language–Independent Dictionary Storage and Access Technique," *IBM Technical Disclosure Bulletin*, vol. 26, No. 11, Apr. 1984, pp. 6085–6086.

Type Right Catches Errors As You Typp (Beep Beep), Xerox Corporation, 1986.

*Webster's Ninth New Collegiate Dictionary*, 1984, pp. 143+144.

*Primary Examiner*—Alyssa H. Bowler
*Assistant Examiner*—John Harrity

[57] ABSTRACT

A data structure for use in hyphenation is created by including hyphen codes at the acceptable hyphenation points of words and then collapsing the words into a minimal state determinized FSM data structure. The transitions of the data structure are sorted so that a hyphen code that has alternatives is positioned before its alternatives. The data structure is then encoded for compactness. In searching with a word, if a mismatch occurs in the branch of the data structure that depends from a hyphen code, the search continues with its alternatives, because a match could be found in a branch depending from one of the alternatives. The data structure may be accessed with a hyphenated word to check hyphenation or spelling. It may be accessed with an unhyphenated word to retrieve its hyphenation points. It may be accessed with a number corresponding to a word to retrieve that word with its hyphenation points. Retrieved hyphenation points may be used in selecting where to hyphenate a word that has more than one hyphenation point, as in justification of text.

24 Claims, 14 Drawing Sheets

COMPACT HYPHENATION POINT DATA

This is a continuation of application Ser. No. 07/739,798, filed Aug. 1, 1991, now abandoned, which was a continuation of application Ser. No. 07/478,043, filed Feb. 6, 1990, now abandoned, which was in turn a continuation of application Ser. No. 07/138,543 filed Dec. 28, 1987, now abandoned.

BACKGROUND OF THE INVENTION

The present invention relates to the storage and retrieval of data defining the points at which a word can properly be hyphenated. More specifically, the invention relates to data structures that include hyphenation points.

Data defining hyphenation points are conventionally included in dictionaries and similar printed lists of words. In a conventional full text dictionary, each acceptable hyphenation point of each defined word is indicated by a mark such as a hyphen, a dot, or an accent, and the entry of a defined word may show the hyphenation points of inflected forms of that word in a similar manner. A user can retrieve the hyphenation points of a word by finding the entry showing that word's hyphenation points. Since the entries of a dictionary are conventionally alphabetized according to the word defined, the user will usually find the entry based on the spelling of the word whose hyphenation points are sought.

Rosenbaum et al., U.S. Pat. No. 4,092,729, describe a hyphenation technique that uses a storage dictionary. As described at col. 2, lines 8–44 and col. 4, lines 12–16, the technique calculates a vector magnitude and angle for a given word, and the magnitude serves as an address in the dictionary at which the angle for the word is stored if the word is correctly spelled. As shown in Table 1, the technique combines a hyphenation byte with each angle representation in the dictionary so that hyphenation points for a correctly spelled word can be retrieved based on magnitude and angle. Herzik et al., U.S. Pat. No. 4,456,969, describe a hyphenation system that uses the technique of Rosenbaum et al. to hyphenate a multi-lingual document, with a dictionary being available for each language as shown and described in relation to FIG. 9 and at col. 4, lines 4–21. Similarly, Carlgren et al., U.S. Pat. No. 4,574,363, describe an enhanced hyphenation function that uses the technique of Rosenbaum et al. for words in the dictionary, but uses an algorithmic search for hyphen breaks for words not in the dictionary, as shown and described in relation to FIG. 5.

Rosenbaum, U.S. Pat. No. 4,028,677, describes a previous hyphenation technique that uses a digital reference hyphenation matrix (DRHM) approach, as shown and described in relation to FIG. 2. As described at col. 2, line 33-col. 3, line 26, the DRHM contains a representation of all legal hyphenations of words that might be anticipated, based on defining the hyphen as a valid character. The alpha word vector representation technique shown in Table 1 is applied to a hyphenation dictionary. No matter where the hyphen resides in a word, the word's magnitude remains unchanged, but the word's angle changes uniquely based on the location of the hyphen, so that all hyphenation possibilities for a given word are stored in one row of memory by using the magnitudes as an address and storing all the corresponding angles at that address. In order to hyphenate an input word a hyphen is added to the word and its magnitude is calculated. Memory is accessed at an address equal to the magnitude, and if that address is not found, the word cannot be legally hyphenated. If the address is found, the corresponding angles representing legal hyphenations of the word, are compared with test words generated by sequentially inserting hyphens in the input word. Hyphenated versions of the input word resulting in equal compares are gated to the output line.

Damerau U.S. Pat. No. 3,537,076, describes an early scheme for automatic hyphenation that does not involve storing hyphenation points. The letters of a word to be analyzed are converted into a reduced character set. This set is then broken up in various ways into all of its possible syllable combinations, and out of these possible syllabifications the most probable syllable pattern is selected. At col. 1, lines 47–72, Damerau discusses disadvantages with the use of a dictionary in which all possible words are stored for look-up to find the word and its proper hyphenation pattern. At col. 4, line 1–9 and col. 5, lines 1–23, Damerau also describes the use of a small dictionary of most frequent errors that is checked before the statistical procedure is initiated.

Casey, U.S. Pat. No. 4,181,972, describes a similar approach to hyphenation in which most words are hyphenated logically based on vowel and consonant patterns. An exception table is also employed for situations that do not fit the logical hyphenation approach.

Dolby et al., U.S. Pat. No. 3,439,341, describe another early hyphenation machine in which a series of letters in a word are analyzed according to the positions of vowels and consonants, as well as letter groups that indicate split points for hyphenation.

It is also known to store a list of words compactly. Tague et al., WO-A 85/01814, describe a data compression technique that uses a dictionary containing a list of words. As described at page 3, lines 11–23 and at page 11, lines 3–32, the dictionary is compressed by storing the words in alphabetical order and taking advantage of the redundancy in characters that results. If two entries begin with the same letters, the second character can be stored with one character representing the number of letters common to both entries followed by the remaining characters not common to both entries.

SUMMARY OF THE INVENTION

The invention provides a very compact data structure that can be accessed to retrieve the hyphenation points of each of a set of words. The data structure can be searched both to check the spelling of a word and to retrieve its hyphenation points.

One aspect of the invention is based on the recognition of a basic problem relating to the compact storage of hyphenation information about each of a set of words. Conventional techniques use one of two approaches in storing hyphenation information about a given word. The first approach is to store all the hyphenation information for each word, either included in the word as in a conventional dictionary or accessible based on the word as in Rosenbaum et al., U.S. Pat. No. 4,092,729, discussed above. The second approach is to store separate information about each acceptable hyphenated form of the word as in Rosenbaum, U.S. Pat. No. 4,028,677. Both of these approaches result in redundancy. The first approach requires that similar hyphenation information about similar words be stored redundantly. The second approach requires that information relating to the characters of a word be stored redundantly.

This aspect of the invention is based on the discovery of a technique for including hyphenation information that permits the reduction of both these types of redundancy. Hyphenation data for each word on a list of acceptable words is included in that word by including a hyphen character at each acceptable hyphenation point. Then, redundant sequences of characters are collapsed to obtain a more compact data structure. As a result, the characters of each word are stored at most once, and some of the characters are stored only once for more than one word, so that not all similar hyphenation information about similar words need be stored redundantly.

Another aspect of the invention is based on the recognition of a problem in the collapsing of a redundant sequence of characters where one character that can follow the redundant sequence is a hyphen. Whether the resulting data structure is to be used for hyphenation or for spell checking, it is necessary to treat hyphen characters in the data structure differently than other characters. For example, if the collapsed data structure is searchable as a directed graph, a branch depending from the last character of the redundant sequence may begin with a hyphen and may have one or more alternative branches beginning with other characters. Upon finding a mismatch within the branch beginning with the hyphen, one cannot be certain that none of the alternative branches to that hyphen contain a match, as one could if all the branches began with ordinary characters. This aspect of the invention is based on the further recognition that this problem can be solved by positioning the hyphen character in relation to the alternative characters so that the search can, upon finding a mismatch, continue with the alternative branches. For example, if the hyphen character is always placed before the alternative characters in the directed graph, the search can continue with each of the alternative characters and their branches.

A data structure according to the invention can be used to retrieve or check hyphenation points or to check spelling. It can be used as an exception list in combination with probabilistic hyphenation rules, or it can be used as a complete list of words with all their hyphenation points. Its compactness facilitates rapid operations.

The following description, the drawings and the claims further set forth these and other objects, features and advantages of the invention.

DETAILED DESCRIPTION

A. General Features

Figure 1:
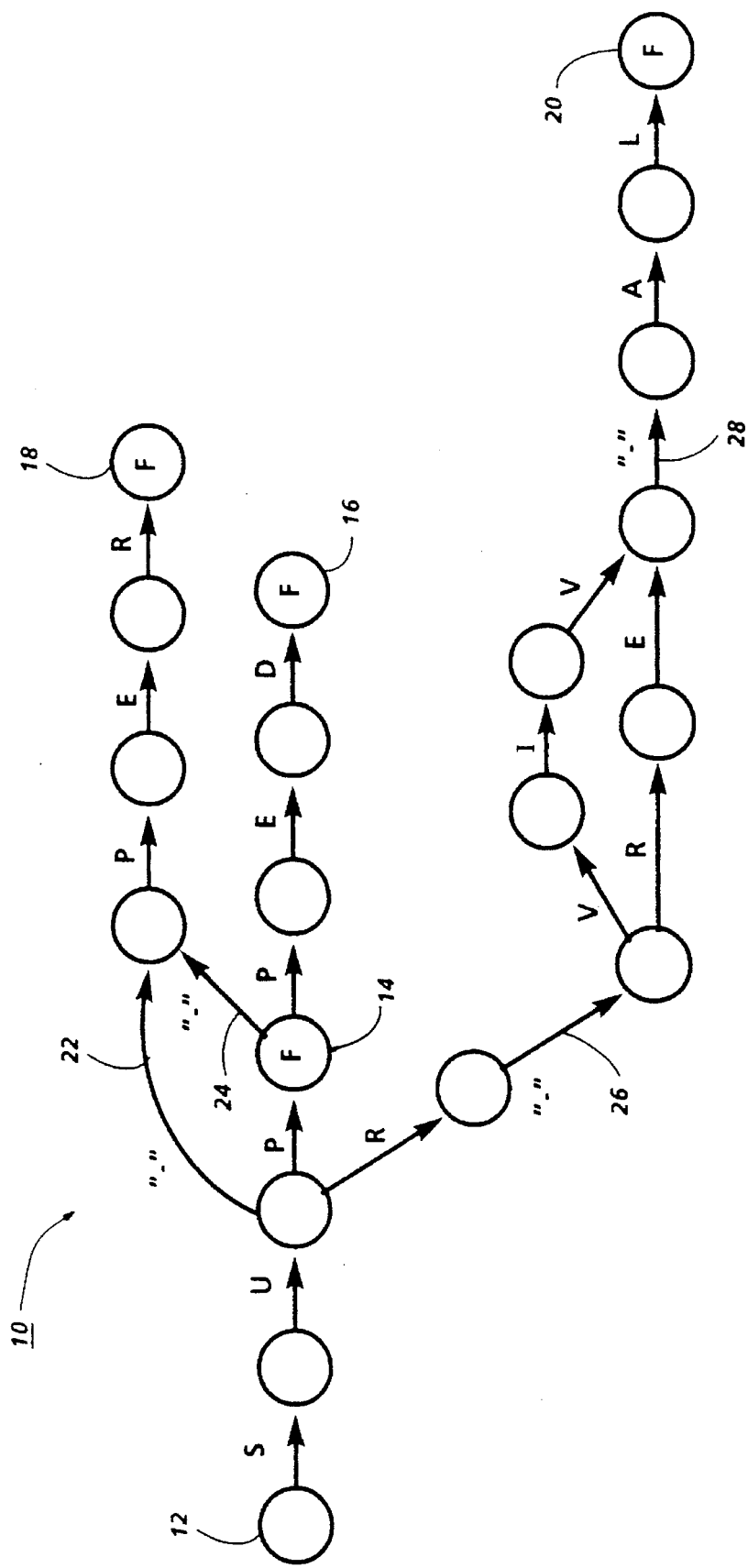
FIG. 1 is a state-transition diagram showing features of a data structure according to the invention.

The general features of the invention can be understood from FIG. 1, a finite state-transition representation of a data structure that includes hyphenation information. The following description of FIG. 1 and of the other figures relates specifically to hyphenation, but the invention is more generally applicable to the parsing of any strings, whether for hyphenation or any other purpose.

Data structure 10 represented in FIG. 1 illustratively includes six words—sup, super, supped, supper, surreal and survival. Two of these words—sup and supped—have no proper hyphenation points according to standard English usage; two—super and supper—each have a single hyphenation point; and two—surreal and survival—each have two hyphenation points. All of these words begin with a common sequence of the two characters "su;" two—super and supper—end with the common sequence of three characters "per," and two—surreal and survival—begin with the common sequence of three characters and a hyphen "sur-" and end with the common sequence of a hyphen and two characters "-al." Therefore, these words are appropriate both for inclusion of hyphenation information and also for reduction of redundancy.

Each circle in FIG. 1 is a state, while each arrow between two states is a transition. Start state 12 represents the position from which data structure 10 may be searched based on the characters of a word. Each outgoing transition from a state represents a character which, when the search is at the position corresponding to that state, is the next character of at least one of the words accepted by data structure 10. The character "s", for example, since it corresponds to the only outgoing transition from start state 12, is the only acceptable first character.

Each transition in FIG. 1 thus leads to another state representing a position in data structure 10 that is at the end of a prefix of at least one acceptable word. If the prefix is the entire acceptable word, the state is marked "F" in FIG. 1 to indicate that data structure 10 includes final data indicating that the final character of an acceptable word has been reached. State 14 follows the final character off "sup;" state 16 the final character off "supped;" state 18 the final character off "super" or "supper;" and state 20 the final character of "surreal" or "survival." As will become more apparent below, data structure 10 also includes alternative data indicating that an outgoing transition from a state has a subsequent alternative outgoing transition and end-of-branch data indicating that a transition leads to a state that has no outgoing transitions, information that is implicit in the representation of FIG. 1.

Most of the transitions in FIG. 1 represent alphabetic characters, but some represent hyphens, indicating a proper hyphenation point of an acceptable word, or, more generally, a parsing point of an acceptable string. These hyphen transitions represent hyphenation data included in data structure 10. Hyphenation data for "super" is represented by transition 22; for "supper" by transition 24; for "surreal" and "survival" by transitions 26 and 28. The corresponding data, such as a hyphen code, indicates a proper hyphenation point after each character leading into the state in which the hyphen transition originates and before each character leading out of the state to which the hyphen transition leads.

FIG. 1 also shows common sequences of characters, or more generally common sequences of elements, collapsed to that the common sequence occurs only once in data structure 10. The prefix sequence "su" occurs only once even though it is in all six acceptable words. Similarly, the prefix sequences "sup" and "sur-" and the suffix sequences "per" and "-al" each occur only once even though in two or more of the acceptable words. The manner in which common sequences may be collapsed to eliminate redundancy is discussed in more detail below.

Hyphenation data can be retrieved from data structure 10 in a number of ways, as discussed in more detail below. FIG. 1 suggests how the word being hyphenated determines the path followed in retrieving the hyphenation data. Before examining retrieval techniques in more detail, we will consider techniques for creating a data structure with the features illustrated in FIG. 1.

B. Data Structure Creation

Figure 2:
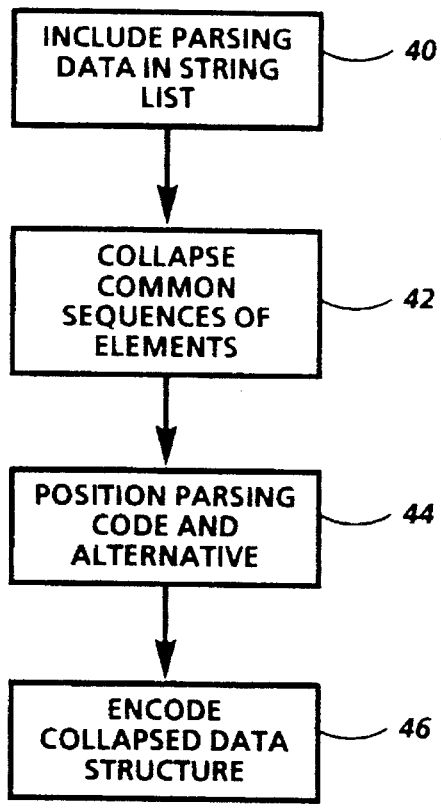
FIG. 2 is a flowchart showing general steps in creating a data structure with string parsing data according to the invention.
Figure 3:
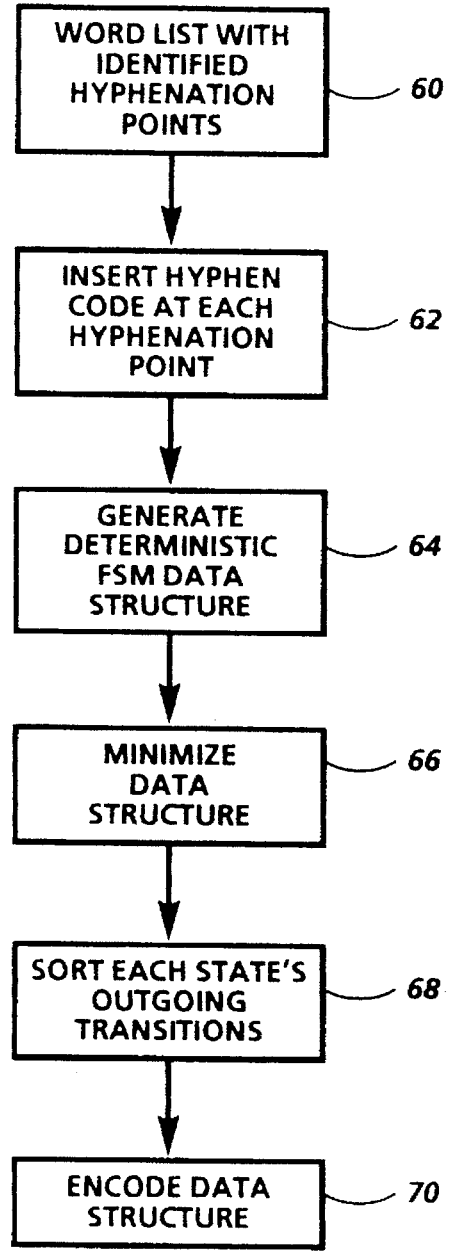
FIGS. 3 and 3A–3H are flowcharts showing steps in creating a data structure with word hyphenation data that follow the steps in FIG. 2.

FIG. 2 shows a sequence of general steps in creating a data structure that includes parsing data from a string list. FIG. 3 shows more specific steps in creating such a data structure for hyphenation from a word list.

The sequence of FIG. 2 begins by including parsing codes in a string list, in box 40. These parsing codes could, for example, be codes indicating acceptable hyphenation points; hyphenation points are but one example, however, of parsing points. A string list is, of course, a data structure with data representing the elements of each string on the list. The data representing each element may be a code identifying that element. This step ensures that the string list also includes, for each string on the list whose parsing points are to be represented, parsing data indicating an acceptable parsing point. The parsing data could be included as a parsing code between the codes representing the preceding and subsequent elements of the string, or it could be included in the code representing one of those elements. If the string list already includes codes that indicate parsing points, it may not be necessary to insert parsing codes, but it may still be necessary to check that the parsing codes are inserted at acceptable parsing points. Also, if the string list includes two or more different codes that can indicate respective types of parsing points, it may be appropriate to change them all to a single parsing code to increase redundancy and facilitate compression of the list.

The step in box 42 collapses sequences of elements that occur in more than one string. A wide variety of techniques can be used to collapse common sequences, but most include, first, identifying a common sequence and, second, replacing some of its occurrences with data indicating where the sequence itself occurs in the data structure. A technique that has proven useful in collapsing common sequences of characters in words is described below.

The step of box 42 produces a collapsed data structure in accordance with the invention, but the collapsed data structure must be accessed to retrieve the parsing data. This could be done in several ways, as discussed below, and the result of such an access is typically a version of the string that includes one or more acceptable parsing points. This version of the string may be obtained by searching the collapsed data structure as a directed graph to find the sequence of branches corresponding to the string.

The step in box 44 facilitates such a search by positioning the branches of the directed graph. A parsing code has a branch of the directed graph that depends from it and includes at least one subsequent element. During a search, that branch should be treated differently than alternative branches of the directed graph that depend from non-parsing codes representing other string elements. If a search of the branch depending from the parsing code indicates that the string in question does not include that parsing code, it is still possible that a search of an alternative branch will indicate that the string is acceptable without that parsing code. Therefore, it is necessary to be able to return to the parsing code and take its alternative branch. The step in box 44 positions the parsing code so that a search can return to it and then proceed to the alternative element that begins the alternative branch.

Even though the string list has been collapsed in the step in box 42, further compression may still be possible by appropriately encoding all the data in the collapsed data structure, in box 46. This compression may be advantageous to meet memory limitations.

The general steps of FIG. 2 can be used to create a data structure that includes the hyphenation data of a word list, as shown in FIG. 3. The technique of FIG. 3 begins in box 60 with a word list with identified hyphenation points. This word list could take many forms. For example, each word could include one of a number of special characters at each hyphenation point, or the numerical locations of the hyphenation points could be included for each word. The step in box 62 inserts a hyphen code at each hyphenation point, so that any other data that encodes hyphenation points can be deleted, leaving in each word a string of elements, some of which are character codes and some of which are hyphen codes at hyphenation points. This step, which is one example of the step in box 40 in FIG. 2, can therefore be done simply by scanning through the word list and replacing the hyphenation data by a hyphen code at each hyphenation point. If there are different classes of hyphenation points (or other parsing points), more than one hyphen code could be used, each hyphen code indicating one of the classes. These classes could, for example, correspond to different degrees of desirability or acceptability of hyphenation points, so that a subsequent choice of a hyphenation point could be made based on the classes of the hyphen codes within a word being hyphenated.

To collapse the word list including hyphen codes, as in box 42 in FIG. 2, the technique of FIG. 3 employs two steps. The first step, in box 64, generates a deterministic finite state machine (FSM) data structure. Then, the second step, in box 66, minimizes the FSM data structure to obtain a minimal state determinized FSM data structure. The first step collapses string prefixes, while the second step collapses string suffixes, so that the resulting data structure is collapsed on both the left and the right. Techniques for performing these steps are set forth in copending, coassigned U.S. patent application Ser. No. 814,147, continued as application Ser. No. 07/193,231, which was in turn continued as application Ser. No. 07/310,032, now abandoned, incorporated herein by reference and referred to herein as the checking application. The checking application shows and describes similar steps in relation to FIG. 4, and shows and describes the details of how these steps are performed in relation to FIGS. 5–11.

FIGS. 3A–3H and the description below provide substantially the same disclosure as FIGS. 4–11 and the description thereof in the checking application.

Figure 3A:
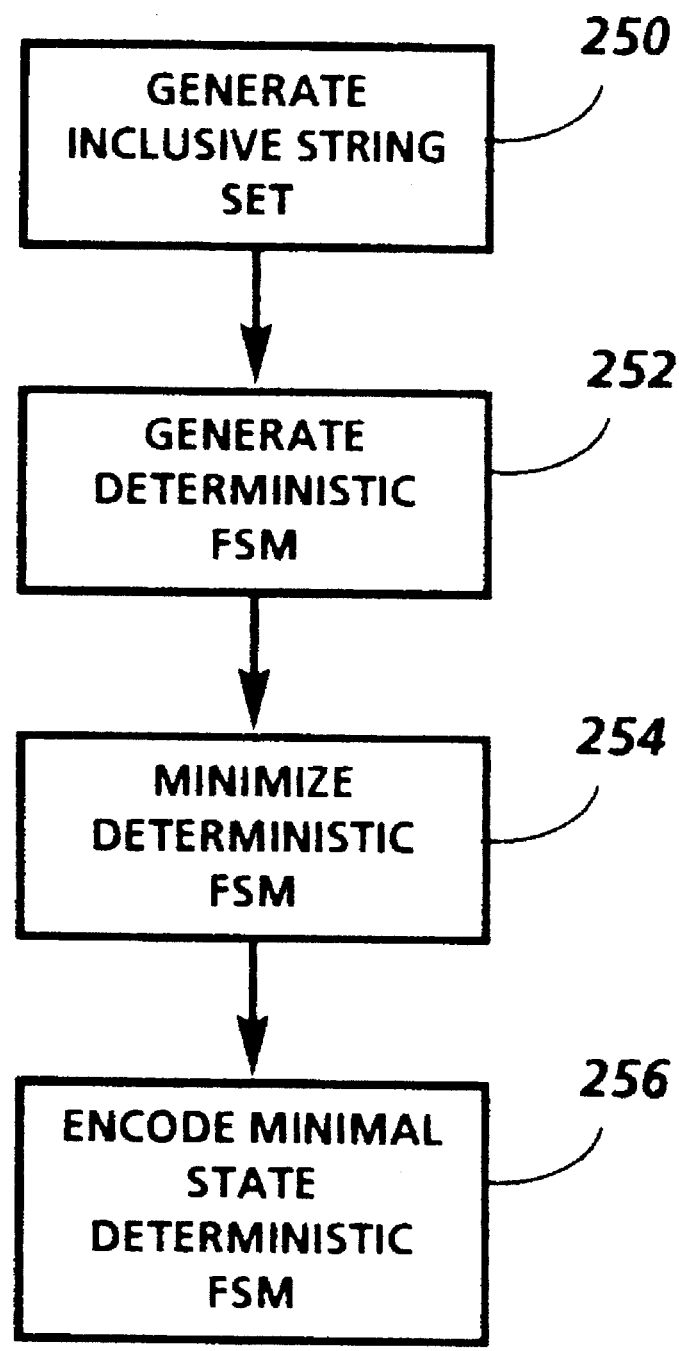

FIG. 3A shows the major functional steps in one technique of building an encoded data structure. This technique results in a very compact encoded data structure containing all the information in a set of strings. The specific implementation of this technique described below also takes into account the need to limit data storage requirements during the building of the encoded data structure. Because of the large data storage requirements of conventional techniques, the use of FSM data structures for storing a large set of strings has been previously considered impractical.

The sizes of the sets of strings involved can be understood by considering that practical spell checking in a natural language necessarily involves a large set of words. Many people have a vocabulary of 20,000 words or more, while a dictionary may contain upwards of 100,000 words. Previously, FSM techniques have not been applied to spell checking because it was not recognized that they could be practical for sets of strings as large as 1000, much less for sets larger than 100,000. The techniques described below can be applied to sets ranging from 1000 words or less on up to more than 1,000,000 words. Due to the possibility of collapsing an FSM data structure in which two or more branches contain the same information, the size of the encoded data structure may become smaller as the set of acceptable words increases in size.

The technique of FIG. 3A begins in box 250 with the generation of an inclusive set of strings, including not only the strings to be accepted by the encoded data structure but also special strings used to determine when application of a rule would be appropriate or when a received string may be on the stop list. All of the information to be included in the encoded data structure can be included in the inclusive set of strings. In the case of a rule, for example, the corresponding string may begin with a sequence of elements which lead to the application of the rule, followed by a special element indicating that a rule may be applied and leading to the rule itself.

From the inclusive set of strings, a deterministic FSM data structure is generated in box 252. An FSM has a finite number of states and transitions, each transition originating in one of the states and leading to one of the states. Each transition may have a label, corresponding to one or more signals such as string elements. If the FSM receives a corresponding element when in the state in which that transition originates, the FSM is able to take that transition. In a deterministic FSM, the labels are mutually exclusive, however, and each state has at most one outgoing transition with each label. Therefore, the generation of a deterministic FSM data structure eliminates a substantial amount of redundancy in the inclusive set of strings by factoring out redundancy at the beginnings of the strings. The resulting data set may conveniently include units of data, each containing information about one of the states in the deterministic FSM. Each of these state units will, for example, include information about its outgoing transitions and about whether that state could occur after one of the acceptable strings.

Although some redundancy has been eliminated from the deterministic FSM data structure, it will typically contain a great deal of additional redundancy. Therefore, in box 254, the FSM data structure is minimized to obtain a minimal state deterministic FSM data structure. This step involves factoring out redundancy at the ends of the strings, so that both common endings and common beginnings each occur only once in the data structure. This is also a step which would have been impractical for large word sets without the techniques discussed below.

The minimal state FSM data structure, although it no longer contains redundant states, will typically be encoded in an inefficient form. Therefore, the final step in box 256 in FIG. 3A is to encode the data structure in an efficient form. A technique for doing can make use of units of data containing information about the FSM transitions rather than the states. The result will be an encoded data structure accepting all the words in the set.

The amount of compaction attainable with the technique of FIG. 3A will depend, of course, on the amount of redundancy in the string set from which the encoded data structure is being built. For one set of English words to which the technique was applied, a deterministic FSM data structure was reduced from 51,239 states and 104,303 transitions to 15,177 states and 33,847 transitions by minimizing, eliminating more than two-thirds of the information in the set of strings as redundant. This means, for example, that one could expect to reduce a string set containing nearly 200 kbytes to about 60 kbytes, making storage in 64 kbytes of memory possible.

Figure 3B:
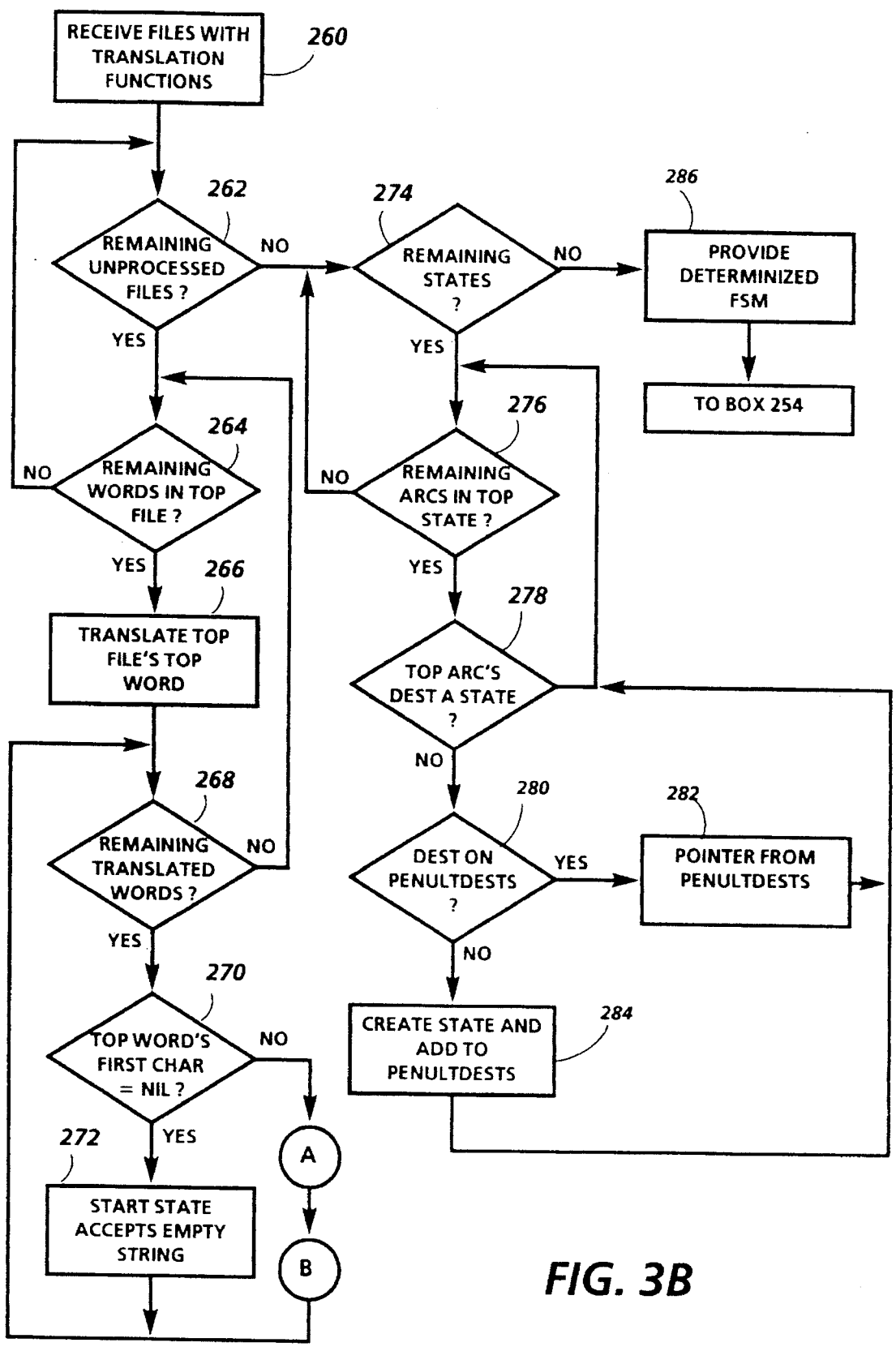
Figure 3C:
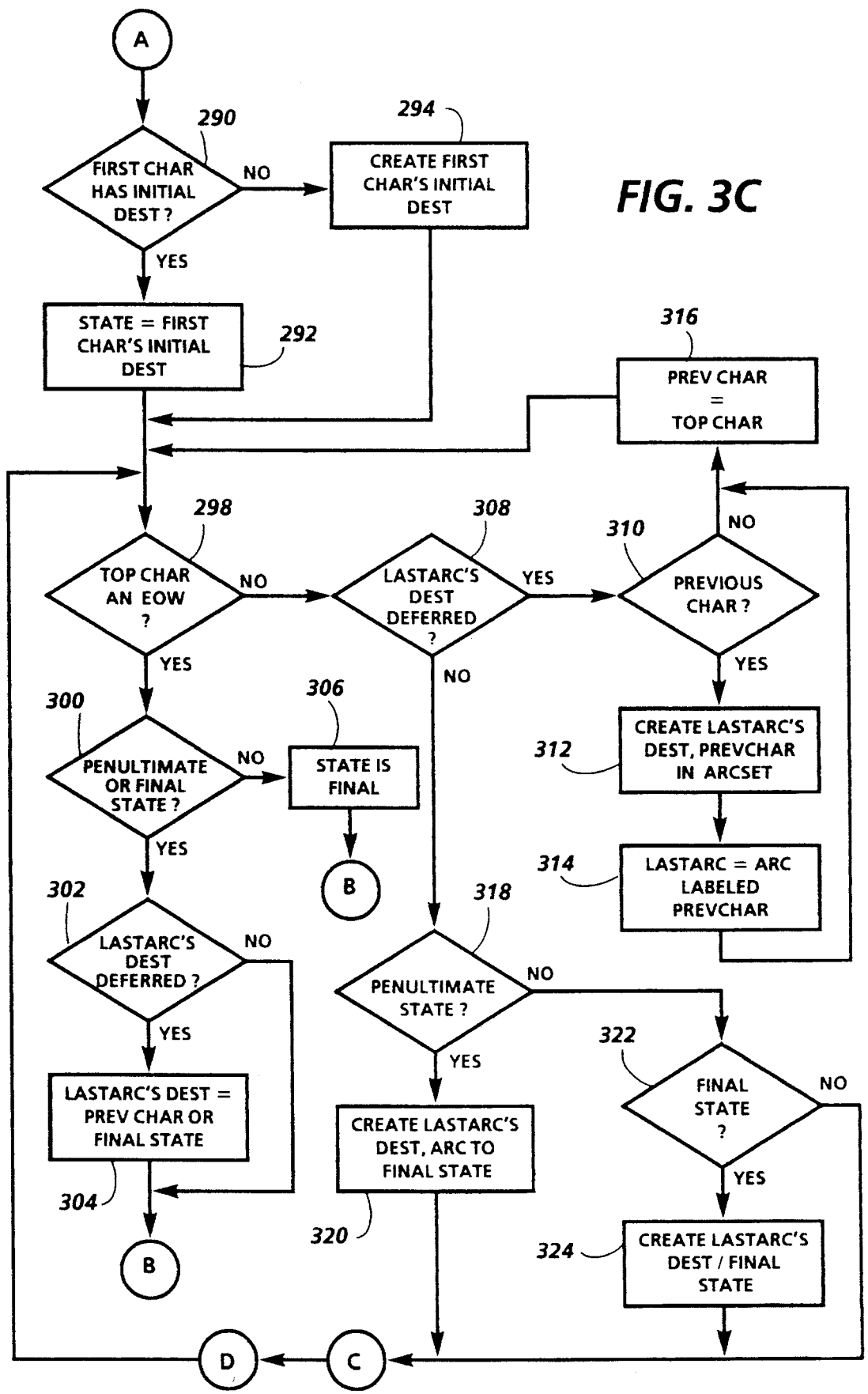
Figure 3D:
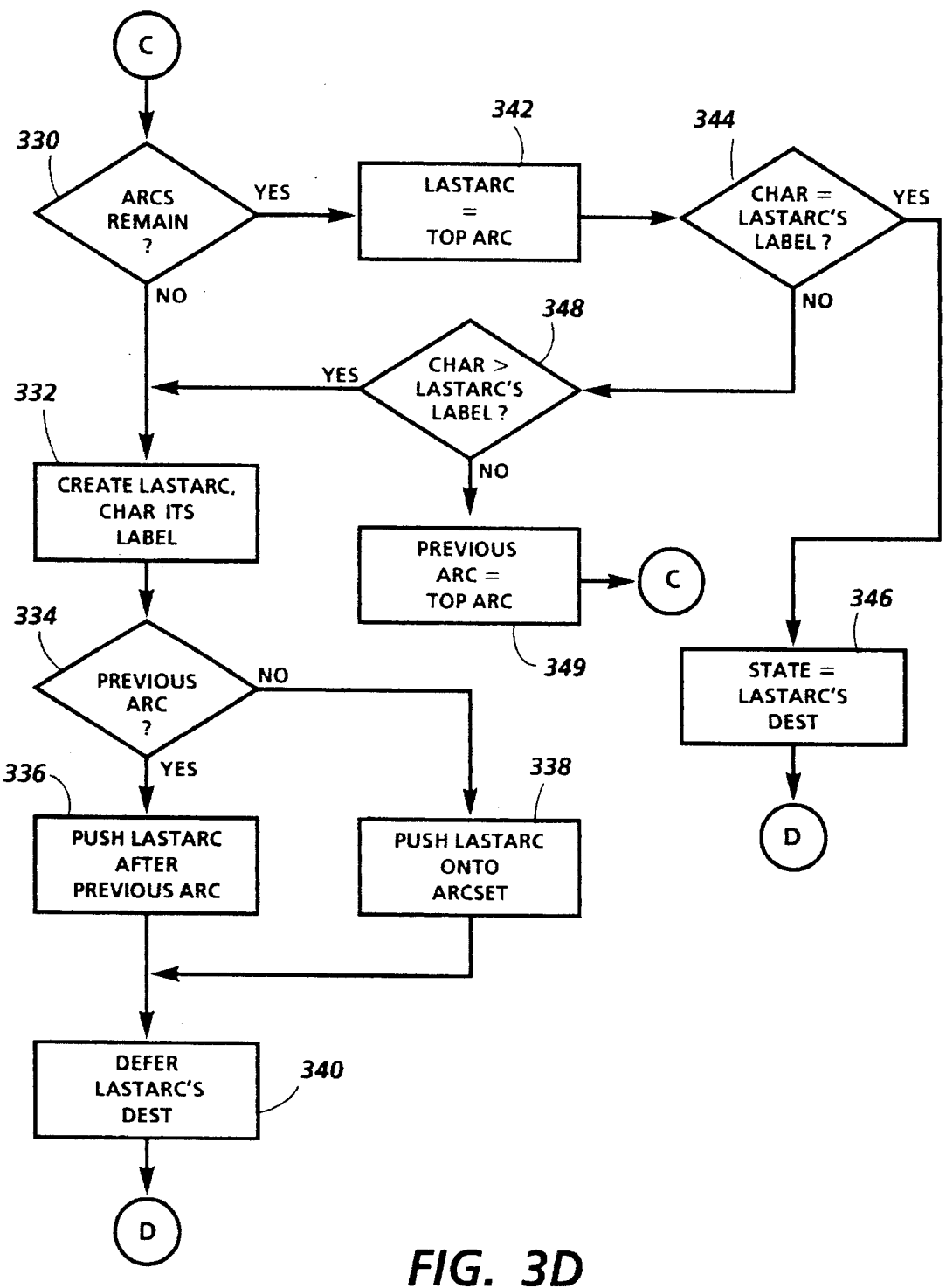

FIGS. 3B–3D are flowcharts showing a method for generating a determinized FSM data structure from a number of files, each containing a set of strings. FIG. 3B is a flowchart of the overall method, while FIG. 3C is a flowchart of part of the method in which the characters of a word are evaluated. FIG. 3D is a flowchart of a part of the method in which characters may be added to the FSM data structure if appropriate.

The method of FIG. 3B begins by receiving the files, each with a respective translation function, in box 260. Each translation function may be used to provide a list of acceptable modified forms of each of the words in the corresponding file. The words in each file should be in a form suitable for modification by the translation function of that file.

A test in box 262 determines whether any files remain to be processed, and, if so, the iterative functions in boxes 262–272 are repeated until all the files have been processed. The test in box 264 first determines, however, whether any words remain in the top file of the unprocessed files. If not, the test in box 262 is again performed, with the previous top file removed.

The top word in the top file is translated using the respective translation function in box 266, resulting in a list of translated words. The translation function will be used for a number of purposes, all relating to improving the FSM data structure which will be obtained. For example, a word may be translated to reduce the character set, as by throwing away characters such as hyphens, ampersands, and so forth. Or the word could be translated into several words, all of which are likely to be acceptable modifications of the word itself according to the morphological rules of the particular language. A test in box 268 determines whether any of these translated words remain, and if not, the test in box 264 is repeated for the top file without the most recently translated top word. As long as translated words remain, however, the test in box 270 determines whether the top translated word's first character is equal to NIL. If so, the empty string is in the file, so that the start state of the FSM data structure must accept the empty string, as noted in box 272. If the top translated word's first character is not equal to NIL, then its characters are all processed according to FIG. 3C, which is entered at A and returns at B. After box 272 or after B, the test in box 268 is repeated and each additional translated word is processed in the same manner.

When all the files have been processed, a negative result will occur in box 262, and the iterative functions in boxes 274–284 are repeated for each of the states created during the processing of the characters of the words. These functions help to conserve storage in advance of the full minimization discussed below. After the test in box 274 determining whether any states remain, a test in box 276 determines whether the top state of those remaining has any arcs or transitions which have not been processed. If so, the test in box 278 determines whether the destination of the top arc is a state which has been created. If so, no further processing of that arc is necessary, and the test in box 276 is repeated for the next arc. But if the top arc's destination is not a state, then it is one of the states which has a transition to the final state. One feature of the method of FIG. 3B is that, in addition to determinizing the FSM data structure, it begins minimization by providing a single final state, and states with only one arc to the final state are stored on a list referred to as Penultdests. If the destination of an arc is not a state, then its destination must be one of the states to be stored on Penultdests. The test in box 280 determines whether that state has already been stored on Penultdests. If so, the destination of the top arc is set to the pointer to that state from Penultdests, in box 282. But if not, a new state is created and added to Penultdests, and it is provided as the destination of the top arc, in box 284. In either case, the test in box 276 is then repeated to find any further arcs. When all the arcs of a state have been processed, the test in box 274 is repeated to obtain the next state.

When all the states have been processed, the test in box 274 yields a negative result, and the determinized FSM data structure has been completed. It is then provided in box 286 so that it can be minimized, as in box 254 of FIG. 3A.

FIG. 3C shows the processing of the characters of each word, during which states are created. In addition to the steps shown in FIG. 3C, each character encountered is noted so that, when processing is completed, the total alphabet of the files will be known, and other similarly tangential steps may be performed.

A test in box 290 determines whether the first character of the word has been previously encountered and provided with a state as its initial destination. If so, the initial destination's location would be stored in an array, referred to as Initial Dests, so that the current state will be the state stored at that location, as shown in box 292. This array permits rapid access to the destinations of transitions from the start state, and thus speeds up the whole determinizing process. Otherwise, a state is created to be the destination of the first character, and the location of this state is added to Initial Dests, in box 294. As in all cases in which a state is created, a unit of data corresponding to that state is set up, and the state unit is added to an overall list of states to permit the test of box 274 in FIG. 3B to be performed. The data in each state unit will generally include an arcset of outgoing arcs, including their labels and destinations, and information about the finality of the state.

When the first character has been processed, the remaining characters are processed by an iterative series of functions beginning in box 298 with a test determining whether the top character is a character such as a NIL which indicates the end of a word, indicating that no further characters remain to be processed. If no characters remain to be processed, i.e. the end of word has been reached, then a test in box 300 determines whether the current state is or relates to a special state called the FinalState. The FinalState is both final and also the end of a branch, with no outgoing arcs, and all such states may be treated as the FinalState if the only information which must be stored about each of them is its finality. The test in box 300 determines whether the current state is the FinalState, or is a state with an arc to the FinalState, referred to as a Penultimate State, or is a state whose most recently visited arc, its Lastarc, has had creation of its destination state deferred pending determination of whether it leads to the FinalState or a Penultimate State.

If the current state relates in one of these ways to the FinalState, a further test in box 302 determines whether Lastarc's destination has been deferred. If so, Lastarc's destination is set to the value of the previous character, if there was one, indicating a Penultimate State, or to the FinalState itself. If the current state did not relate to the FinalState, then an item of data is included with the information about the current state to indicate that it is final, as shown in box 306. This will be the case where the current state, although final, also has outgoing arcs to states other than the FinalState. On completion of box 304 or box 306, or if the test in box 302 yields a negative result, the current word has been completed, and the test in box 268 of FIG. 3B is repeated to determine whether further words remain.

If the top remaining character is not an end of word, so that box 298 yields a negative result, a test in box 308 similarly determines whether Lastarc's destination was deferred. If so, this is the second character of a word or else the previous character did not match the label of an outgoing arc previously stored with the current state which had a destination created. The test in box 310 determines which of these applies, since there will have been no previous character if this is the second character of a word. If there was a previous character, a state is created to serve as Lastarc's destination in box 312, and the previous character is provided as the label of one of its arcs. Then, in box 314, this new arc is designated as the Lastarc of the current state, which is the newly created state. After box 314, or if the test in box 310 yielded a negative result, the previous character is set equal to the top character just processed, and another iteration is begun for the next character, if any, in box 298.

When the test in box 308 yields a negative result, the previous character matched the label of an outgoing arc of the current state whose destination had been created, so that the next character will correspond to one of the arcs from a state which has already been created. Therefore, the test in box 318 determines whether the current state is a Penultimate State, with an arc to the FinalState. If so, in box 320, the pending Lastarc from that state must have a destination created which has an arc to the FinalState because a character which does not lead to the FinalState has been received in what was thought to be a Penultimate State. This new state then serves as the Penultimate State. Similarly, the test in box 322 determines whether the current state is the FinalState, in which case an arcless dummy for the FinalState is created in box 324 to serve as the Lastarc's destination. From these matters, which are essentially housekeeping to tie up the loose Lastarc, the routine of FIG. 3C enters the subroutine of FIG. 3D at C, in order to add an arc to the arcset of the current state if necessary.

The test in box 330 in FIG. 3D begins an iterative series of functions by testing whether the current state has any arcs remaining to be compared to the current character. If not, all of the arcs have already been compared with the current character unsuccessfully. Therefore, in box 332, a new Lastarc is created with the current character as its label. Then a test in box 334 determines whether the current state had any previous arcs. If so, the new Lastarc is simply pushed into the arcset after the previous arc in box 336. If not, the Lastarc is pushed into the arcset ahead of any arcs which may be there in box 338. Then, in box 340, the creation of a destination for the Lastarc is deferred, since it may lead to a Penultimate State or to the FinalState.

If the test in box 330 determines that the current state has arcs remaining to be compared with the current character, the top remaining arc is taken as the Lastarc in box 342. The test in box 344 then determines whether the character matches Lastarc's label. If so, since a determinized data structure is being created, no additional arc should be created, but rather the same arc should be followed, so that its destination is set as the new current state in box 346. If that arc has a destination which has not been created, or which is a Penultimate State or the FinalState, the current state will take an appropriate value which can then be tested, as in boxes 300, 302, 308, 318 and 320 in FIG. 3C. Otherwise, the current state will be a state which has been created. In any event, the test in box 298 in FIG. 3C is then repeated to determine whether further characters remain in the current word.

If the test in box 344 yields a negative result, an additional test in box 348 determines whether the character is greater than the label of Lastarc. In other words, the characters are prioritized from small to great, with each arc being ordered in the arcset according to the priority of its label. If the label of Lastarc is smaller than the current character, then we have passed the point in the arcset where an arc with the current character as its label would be located. Therefore, the steps in boxes 332–340 are performed in the same manner as described above. If the test in box 348 indicates that the appropriate point in the arcset has not yet been reached, however, the top arc just compared is set as the previous arc in box 349, and the subroutine of FIG. 3D begins again with the test of box 330.

At this point, the determinized FSM data structure has been constructed from the files. During the method of FIGS. 3B–3D, as noted above, a list of the states created has been kept, as well as a list of the characters of the alphabet. This information can then be provided to permit minimizing, as discussed below.

Figure 3E:
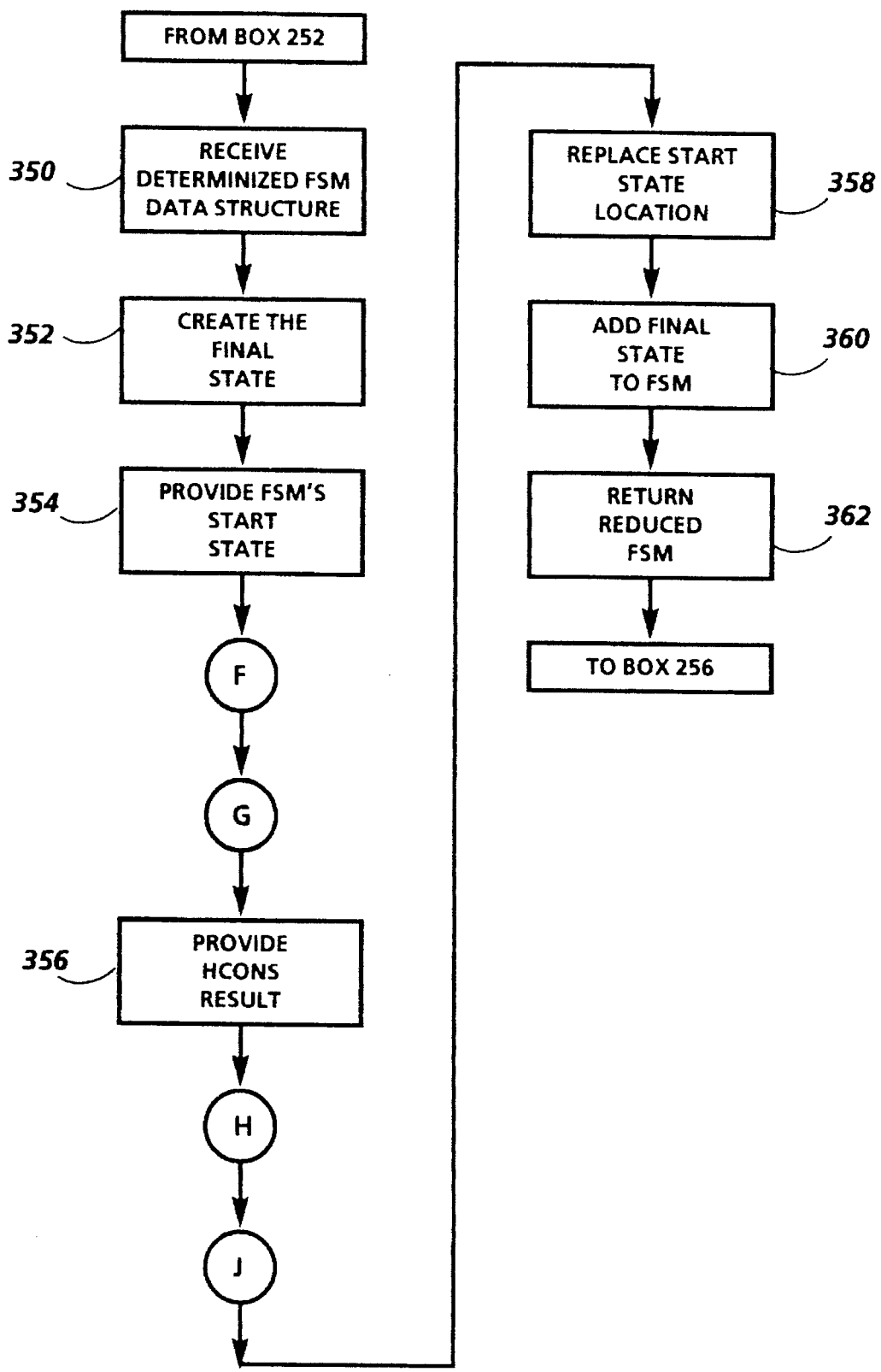
Figure 3F:
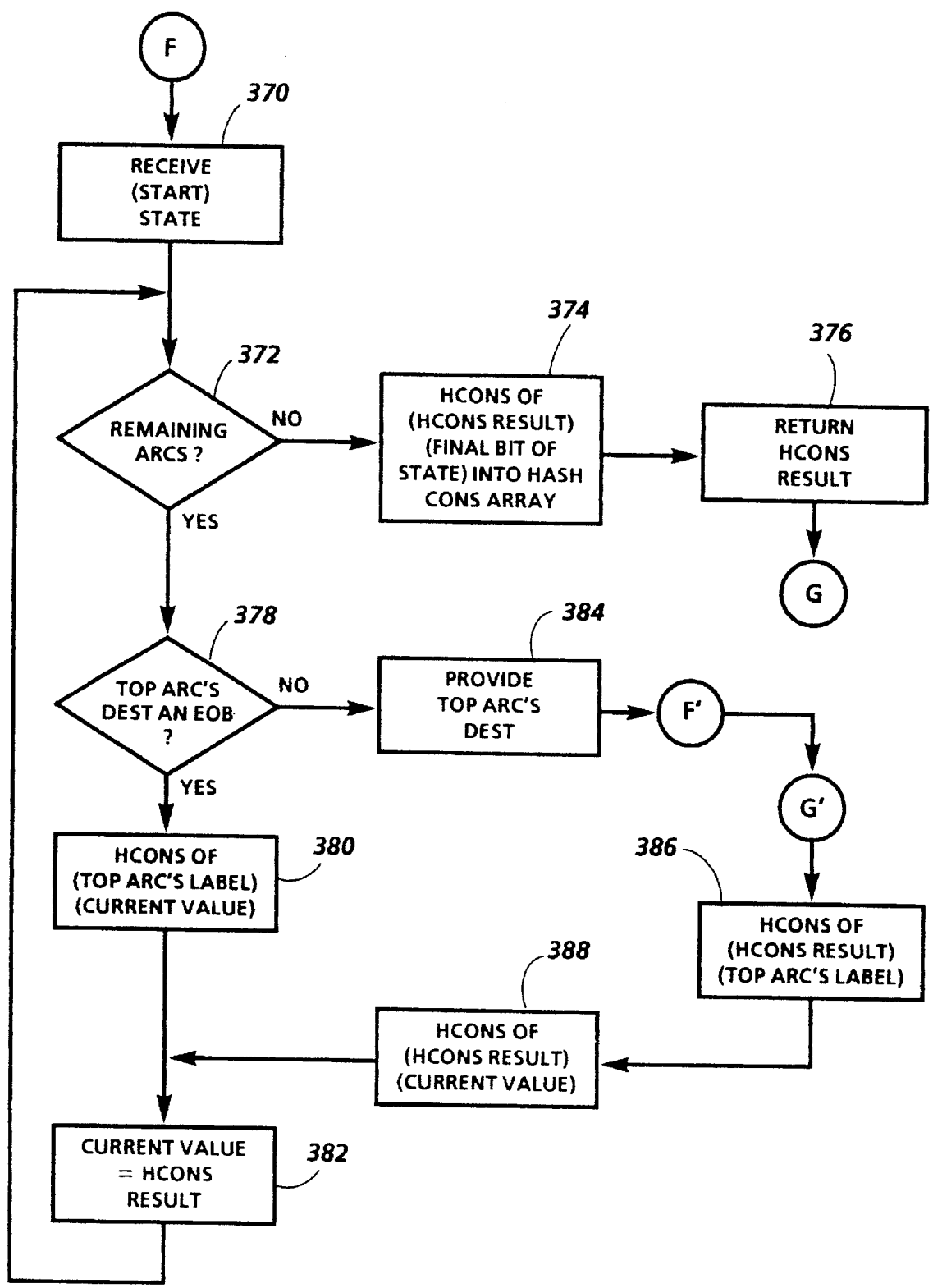
Figure 3G:
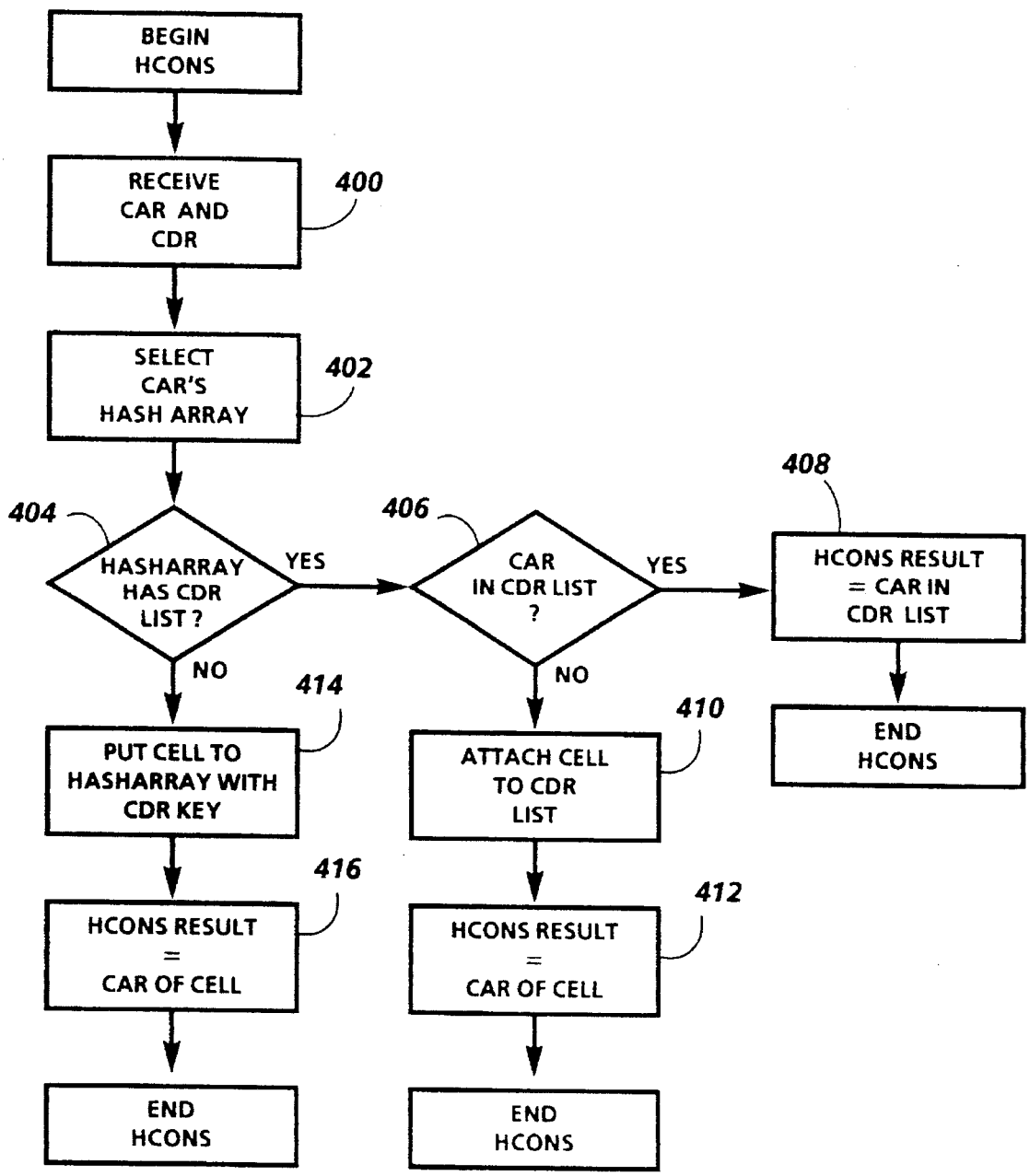
Figure 3H:
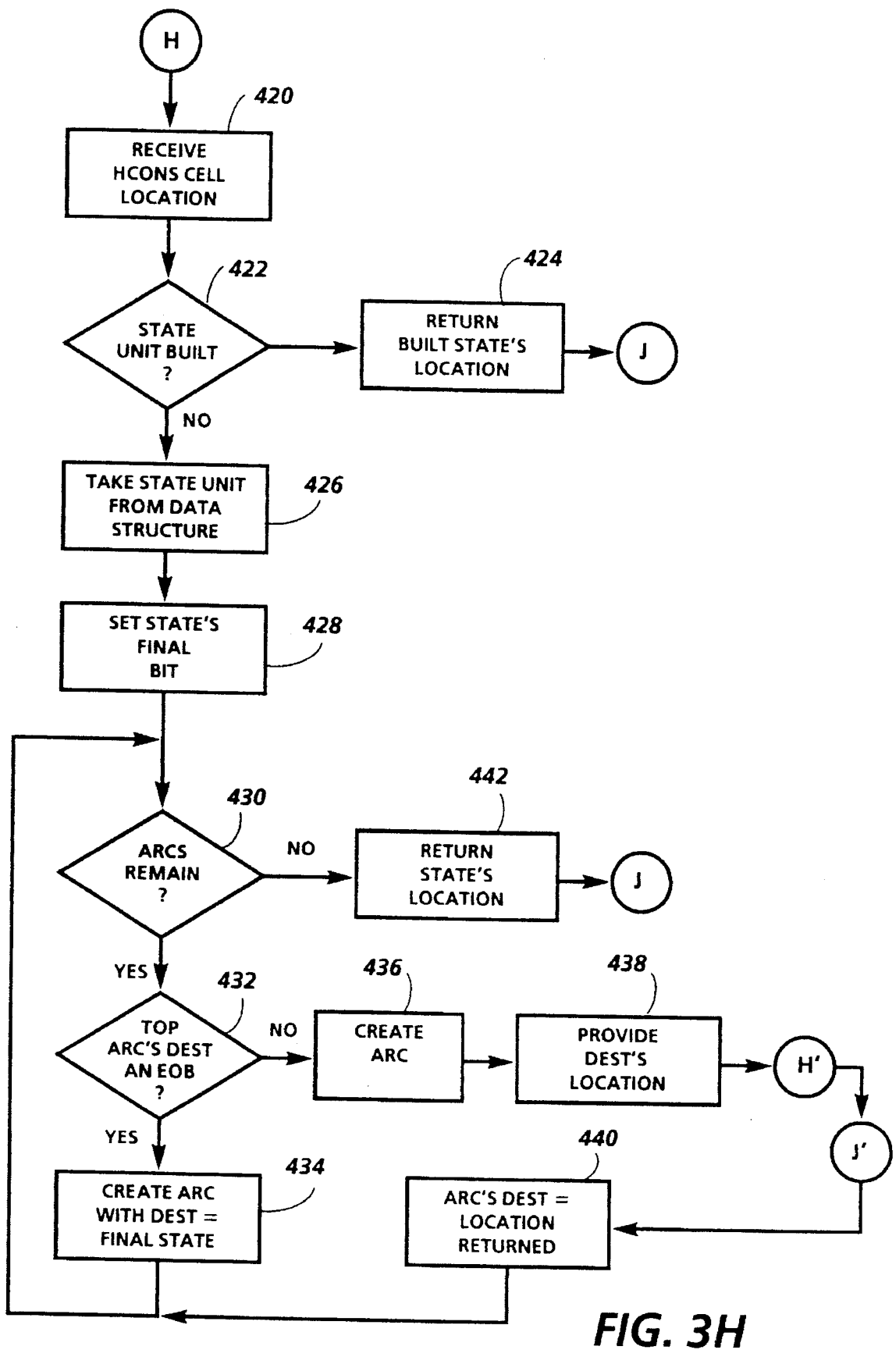

FIGS. 3E–3H show one technique for minimizing a determinized FSM data structure. FIG. 3E shows the overall method, while FIGS. 3F and 3H show routines called within the method of FIG. 3E. FIG. 3G shows details of the routine of FIG. 3F which result in minimization.

The method of FIG. 3E begins by receiving the determinized FSM data structure produced in box 252 of FIG. 3A. The method of FIG. 3E further depends on certain other characteristics of the received data structure: None of the arcs within it may lead to the state in which they originate, directly or through other states, and the arcs of each state must be ordered in the same way by their labels. These characteristics make the minimization of a determinized FSM data structure accepting a relatively large set of strings practical, both in terms of time and in terms of memory usage.

The general strategy of the method of FIG. 3E is to transform the received FSM data structure into a data structure which represents associations between pairs of items or elements of information such that the association between any given pair of elements is at one unique location in memory. Only one location will be used for that pair of elements no matter how many times it figures in relation to other associations between pairs of elements. The elements relate to the parts of the FSM data structure, which includes states and arcs. Each state may be regarded as a collection of associations between pairs of elements, such as associations between an arcset and each arc in it, between each arc and its label and destination, and between an arcset and an indication of whether the state in which it originates is final. Two pairs of associated elements may be regarded as equivalent, so that they should both be stored at the same location, when, having reached either of them in moving through the FSM, the remaining part of the FSM which follows either of them accepts exactly the same strings as the remaining part following the other. In other words, all subsequent associations reachable from one are reachable in the same way from the other.

For a loop-free FSM data structure, the transformed associations making up a state and the part of the FSM subsequent to it and transformed associations making up another state which is equivalent will be represented at the same location in memory because the associations related to a state are constructed recursively through a novel procedure according to the invention. The procedure, referred to below as HCons, receives the elements to be paired and returns the unique location in memory that contains their association. Recursively transforming the associations of each state using this HCons procedure is a practical technique for obtaining the minimal state FSM data structure for a given loop-free FSM meeting the requirements mentioned above. It can also be beneficially applied to other loop-free FSMs, such as those containing epsilon transitions. It may even be possible to obtain a more compact data structure by introducing epsilon transitions systematically to facilitate sharing of the trailing portions of arcsets, performing the transformation with the epsilon transitions in the data structure. This technique will not, however, be certain to produce the minimal state FSM data structure. The meaning of the minimal state FSM data structure can be understood from Hopcroft, J. E. and Ullman, J. D., *Introduction to Automata Theory, Languages, and Computation*, Addison-Wesley (1979) at pp. 65–71.

After receiving the FSM data structure to be minimized, the method of FIG. 3E first proceeds to the optional step of creating the FinalState in box 352. As noted above, the FinalState is a state with no outgoing arcset. This step provides a location so that when an arc leading to FinalState is found, this location can be used as its destination.

At this point the process of minimization begins, and the start state of the FSM is provided in box 354 to a routine which is called at F. This routine, discussed in relation to FIG. 3F, below, performs the transformation of the FSM into a data structure of unique associations. In FIG. 3E, the transformation provides at G the HCons result, discussed in greater detail below. In short, the HCons result represents all the information in the FSM accessible from the start state, but transformed so that common suffixes are combined in the data structure of unique associations. This data structure is provided in box 356 to another routine, called at H, which converts the data structure of unique associations into a new state list data structure mirroring the uniqueness of the associations and then returns the location of a state equivalent to the original start state at J. In box 358 this location replaces the location of the original start state of the FSM, and in box 360 the FinalState is added to the list of states of the FSM. Then, in box 362, original states which are no longer needed in the reduced FSM are eliminated, providing the resulting FSM data structure, which will be minimal under the conditions set forth above. This data structure is ready to be encoded in box 256 of FIG. 3A.

The routine which is called at F in FIG. 3E is shown in greater detail in FIG. 3F. This routine receives a state in box 370, which will be the start state of the FSM the first time it is called. The routine of FIG. 3F recursively calls itself, however, to go through the entire FSM, and the state which it receives on a recursive call will not be the start state.

The test in box 372 determines whether the received state has any arcs which have not been processed by an iterative sequence beginning in box 372. If no arcs remain, the iterations have been completed, and the HCons procedure mentioned above is performed on two elements, a previous HCons result representing all the information in the state's arcset and the final bit of the state, in box 374. Then, the result of this HCons is returned in box 376. The routine then returns at G to the routine in which it was called.

HCons occurs at several places in FIG. 3F, and is described below in greater detail in relation to FIG. 3G. As mentioned above, HCons serves to check whether the same pair of elements has been received before. If an association for this pair of elements was previously created, the location of that association is returned. Otherwise, a new association is created and its location is returned. A method of detecting previous associations is described below.

The use of pairs of elements is based on the recognition that the techniques of list processing can be used to minimize FSM data structures. The conventional way of creating a list in the commonly used list processing language LISP is the CONS command, which creates a cell containing two pointers, one, the CAR, pointing to the contents of that cell and the other, the CDR, pointing to the next cell in the list, or, if there is no next cell, to NIL. The CONS command, however, will create such a cell even if the same two pointers are stored in another cell, resulting in redundancy.

The HCons operation, unlike CONS, will only create a cell if the pair of elements which are its contents have not previously been put in another cell, and therefore eliminates redundancy. In other words, HCons always returns a cell representing a specified association between a pair of elements, and it will return that same cell for all associations equivalent to that specified association. This permits minimization of an FSM data structure, because it permits elimination of the redundancy which would result if identical branches of an FSM data structure were stored in more than one location. By representing each branch as a list beginning with a cell, the new pair of elements which would begin a new list may be compared with the previously created pairs of elements which begin lists, and, if identical to a previously created pair, no new list need be created.

The HCons of box 374, then, determines whether the final bit of the received state has the same value as the final bit of a state which previously yielded the same HCons result. If so, it is not necessary to add a new cell for the final bit, but otherwise a new cell is necessary, and HCons takes the appropriate action, returning its result to its calling routine in box 376.

The information about the arcset is represented as it is accumulated by a variable Current Value which starts with the value NIL and takes the value of successive HCons results. If the test of box 372 yields an affirmative result, so that outgoing arcs remain to be processed, the test in box 378 next determines whether the destination of the top arc is an end of branch, meaning that it has no outgoing arcs. Therefore, the cell to be created will have as its CAR the label of that arc and its CDR will be the previous Current Value. For the first arc of each state, Current Value will have a value of NIL, but due to a subsequent reversal of the order of the arcs in the arcset, this NIL value will indicate the end of the arcs. After the HCons cell for each arc is created, Current Value for this state is set to the location of that cell, in box 382, and the test for remaining arcs in box 372 is repeated.

When the test in box 378 yields a negative result, the top arc's destination has outgoing arcs which must be processed. In box 384, that destination is provided to a recursive call of the routine of FIG. 3F at F', distinguished from the call of the calling routine at F. The recursively called routine will return a HCons result to its calling routine at G', and this result is the CAR of the next HCons operation in box 386, with the label of the top arc as the CDR. The result of that HCons in turn is the CAR of another HCons operation in box 388, in which the CDR is Current Value. As above, if this is the first arc of a state, Current Value will have a value of NIL, but otherwise the location of a previously created arc, so that the arcs can subsequently be reversed to provide a linked list. Then, as above, Current Value for this state is set in box 382 to the location of the cell created in box 388 in preparation for the next iteration.

FIG. 3G shows in more detail how the operation HCons may be implemented. As described above, HCons is called with a number of different pairs of arguments, but in each case the first argument serves as the CAR and the second as the CDR of the HCons cell which, if it does not match an existing cell, will be created. Therefore, HCons begins by receiving the CAR and CDR in box 400. HCons also operates on Hashconsarray, an array of hasharrays, each corresponding to a group of values of CAR. The Hashconsarray stores the previous associations between the CAR-CDR pairs in a way that makes it efficient to check whether a previous association between the same pair of elements exists. In box 402, HCons selects from Hashconsarray the hasharray of the present CAR, and the test in box 404 determines whether CDR is a key in that hasharray. Each key in the hasharray is paired with a list of cells which have that key as CDR and one of the group of values of CAR which corresponds to that hasharray.

When a list is found with CDR as its key, a test in box 406 further tests whether the present CAR is the CAR of one of the cells on that list. If so, an identical cell already exists, so that another cell should not be created. Therefore, the HCons result is set in box 408 to the location of the matching CAR in the list for which CDR is the key. Then HCons returns this result to the routine which called it.

If the test in box 406 had a negative result, CAR is not in the list for which CDR is the key. Therefore, a cell is created with CAR and CDR and this cell is attached to that list in box 410. Then, HCons result is set to the CAR of the newly created cell, in box 412, and HCons returns this result to the routine which called it.

Similarly, if the hasharray corresponding to CAR does not have a list to which CDR was the key, a cell is created with CAR and CDR and is put on such a hasharray in box 414. The HCons result is then set to the CAR of this new cell in box 416, and HCons returns this result.

The particular value of the HCons operation in the present invention is that it inherently minimizes the FSM data structure by treating a state as the same as any other state which has the same dependent block of data. Although HCons does this by the simple expedient of creating a new cell only when no previously created cell has the same CAR and CDR, the result is dramatic.

Upon completion of the routine of FIG. 3F, the HCons cell containing all the information about the start state is returned at G in FIG. 3E. The routine called at J in FIG. 3E, shown in more detail in FIG. 3H, rebuilds the information into a data structure with state units which are appropriate for subsequent operations.

The routine of FIG. 3H begins by receiving the location of the HCons cell containing information about a state, in box 420. If the HCons cell being rebuilt is that of the start state, its location will be provided by the routine of FIG. 3E, in the form of the HCons result, but if the HCons cell is that of another state from the FSM, its location will be provided with a recursive call as at H', mentioned below. The routine first tests whether a state unit corresponding to this HCons cell has already been built by the routine of FIG. 3H, in box 422, and, if so, simply returns the location of the state unit in box 424. This location is provided at J to the routine from which the routine of FIG. 3H was called. If the rebuilt HCons cell is that of the start state, the routine of FIG. 3H has completed the rebuilding process, and the location of the start state is returned at J.

The test in box 422 of whether the HCons cell representing a state has been rebuilt can be performed by testing whether the CAR of that HCons cell is in fact organized as a state unit of data.

When a state is encountered whose HCons cell has not yet been rebuilt, a state unit of data is obtained from the state list of the original FSM data structure in which the information about the states had previously been stored, in box 426. In other words, the next position in the previously created linked list is used for efficiency. This will always work, since the minimization of the information about the states will reduce the number of positions needed in the linked list, so there will always be remaining positions to be reused.

Once the state unit has been obtained, information can be put into it. As discussed above in relation to FIG. 3F, the last HCons operation on each state, in box 374, locates the final bit of that state in the CDR of an HCons cell, with the CAR of the cell being a pointer to the HCons cell of the first arc in its arcset. Therefore, the final bit can be obtained simply by taking the CDR of the location of the state, and it is set in box 428.

Then begins the construction of the state's arcset, beginning with the cell pointed to by the CAR of the cell in which the final bit is stored. The test in box 430 determines whether arcs remain to be included in the arcset. If so, the test, in box 432 determines whether the destination of the top arc of those remaining is an end of branch. These tests can also be related to the HCons operations in FIG. 3F. The last arc in the linked list of arcs of a state will be the one whose label was first stored in an HCons cell, so that Current Value when it was stored was NIL, and Current Value was the CDR of the last cell created. If the CDR of the next cell is NIL, the corresponding arc is the last arc for that state. Similarly, if the arc's destination was an end of branch, the arc's label was the CAR of the last cell created, but if not, the CAR of the last cell created was a pointer to another cell whose CDR is the arc's label. Therefore, if the CAR of the next location points to a cell, the arc's destination is not an end of branch.

When the arc's destination is an end of branch, the arc is pushed into the arcset, with its label taken from the CAR of its HCons cell and its destination set to the FinalState, in box 434. If not an end of branch, the arc's destination has arcs, so that it is necessary to rebuild the states to which those arcs lead. First, the arc is pushed into the arcset in box 436, with its label taken from the CDR of the cell pointed to by the CAR of the last cell. The CAR of that other cell is then provided as the location of the arc's destination, in box 438, and the routine of FIG. 3H recursively calls itself at H', distinguished from H. Upon completion of the recursive call at J', the location of the arc's destination will be returned and set in box 440. Then, the test of box 430 is repeated, until it has a negative result.

When the test of box 430 indicates that no arcs of the current state remain to be pushed into the arcset, the location of the state unit which has just been constructed is returned in box 442 to the routine which called the routine of FIG. 3H. For all states but the start state of the FSM, this location will be returned to the routine like that in FIG. 3H which made a recursive call. For the start state, however, the location will be returned as the location of the start state of the minimized FSM to the method of FIG. 3E.

To position each hyphen code in relation to its alternative, as in box 44 in FIG. 2, the technique of FIG. 3 sorts the outgoing transitions of each state in the FSM data structure, in box 68. If a state has a hyphen code as one of its outgoing transitions, this sort locates the hyphen code as the first outgoing transition. The other outgoing transitions can be sorted in any appropriate way. Because the hyphen code is the first outgoing transition, it will be encountered first in searching. This ensures that a search of the FSM data structure will not match a word without finding all its hyphen codes; in other words all hyphen codes in a word must be found in order to match that word. As described further below, the location of a hyphen code can be recorded if it has alternative outgoing transitions, and the search can subsequently return to it if the word sought does not end in the branch depending from it. After returning to the hyphen code, the search can continue to each of the alternative outgoing transitions, as necessary.

The technique of FIG. 3 concludes by encoding the data structure in box 70, as in box 46 in FIG. 2. Techniques for performing this step for a minimal state determinized FSM data structure are set forth in copending, coassigned U.S. patent application Ser. No. 814,146, continued as application Ser. No. 07/274,701, which was in turn continued as application Ser. No. 07/776,909 which was in turn continued as application Ser. No. 07/855,129, now as U.S. Pat. No. 5,450,598, incorporated herein by reference and referred to herein as the encoding application. The encoding application shows and describes encoding in relation to FIGS. 1, 5–10 and 12.

We turn now to techniques for using a data structure produced in the manner set forth above.

C. Hyphenation Techniques

Figure 4:
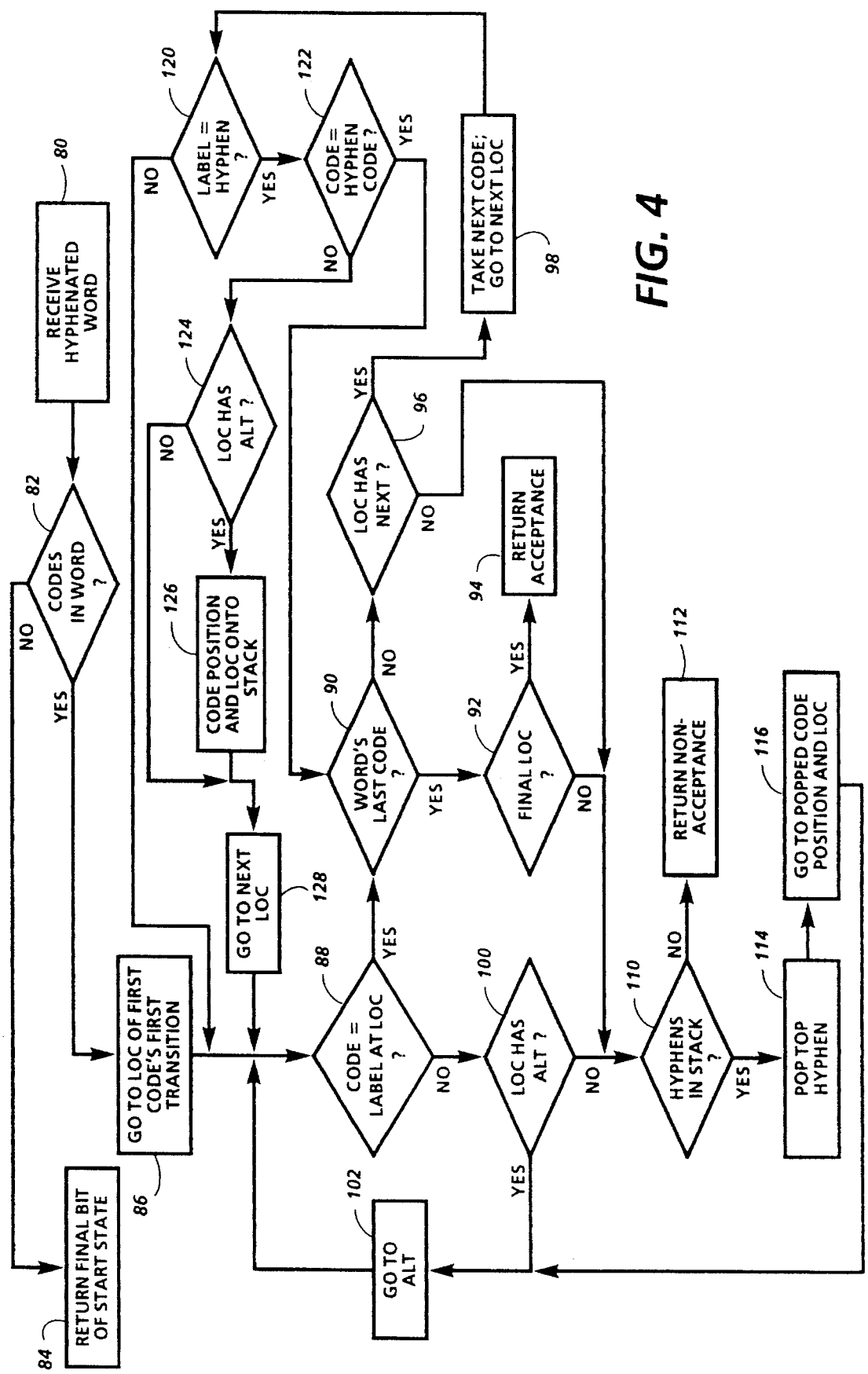
FIG. 4 is a flowchart showing steps in checking hyphenation of a word according to the invention.
Figure 5:
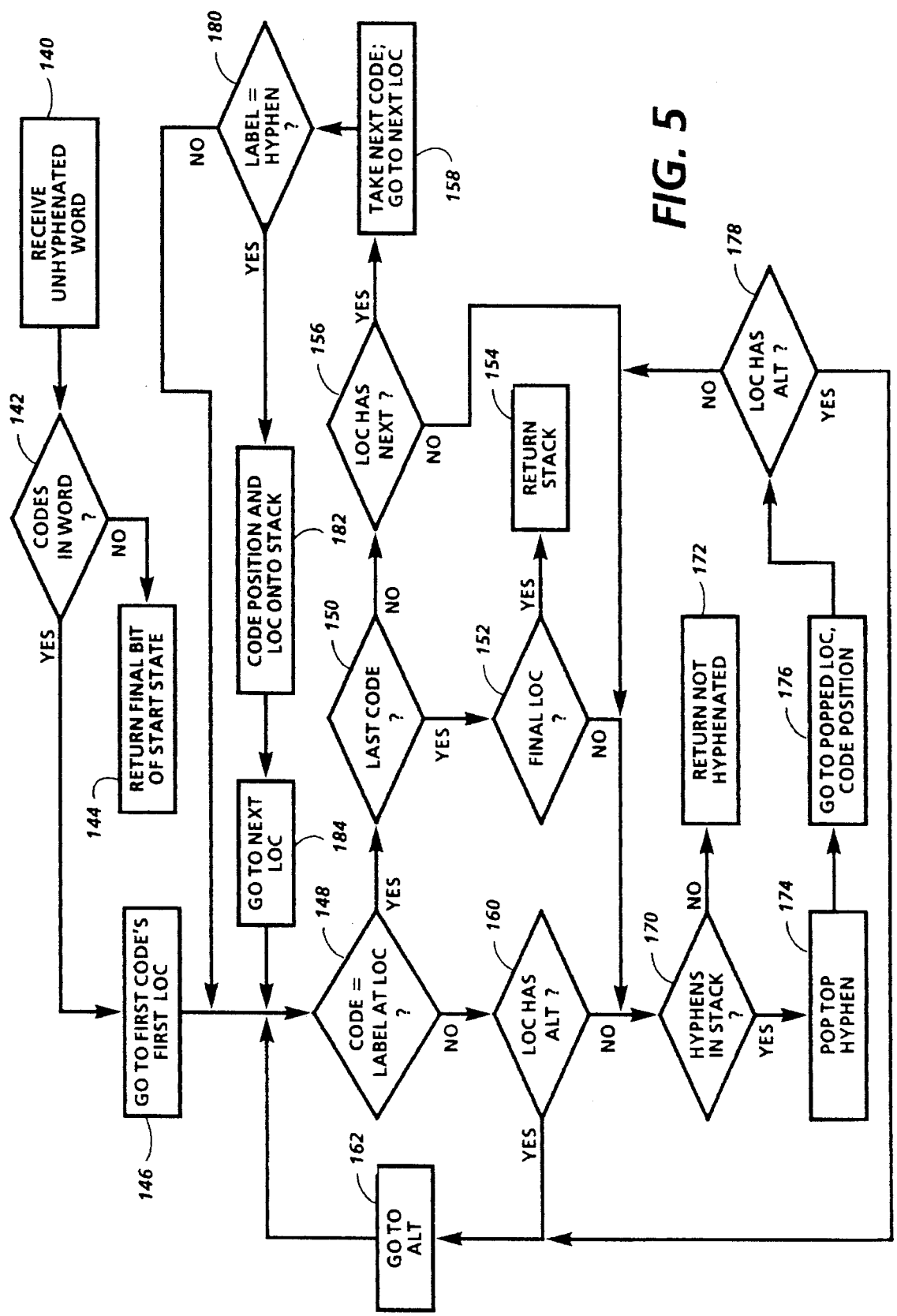
FIGS. 5 and 5A are flowcharts showing steps in retrieving hyphenation points using the characters of a word according to the invention.
Figure 6:
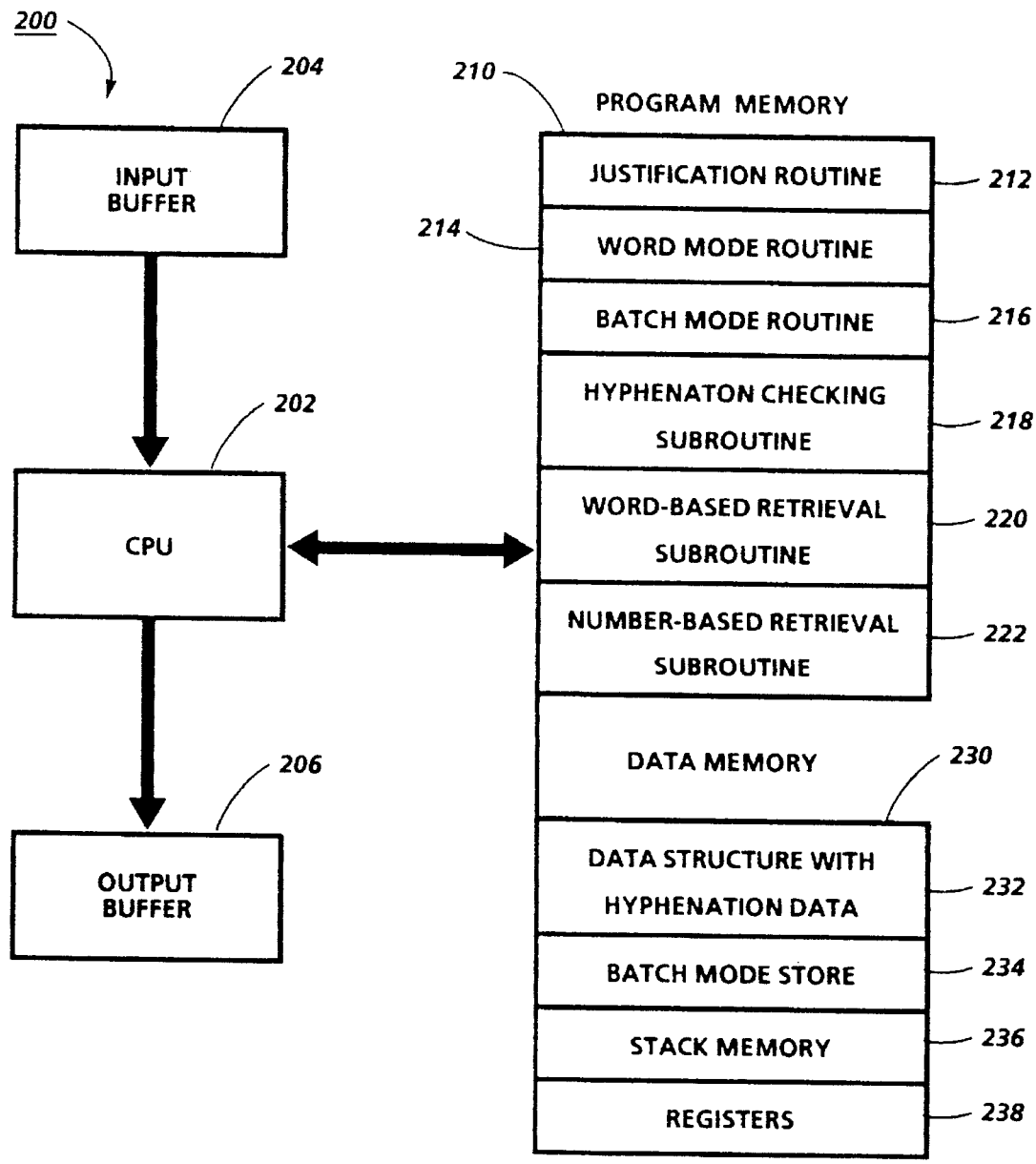
FIG. 6 is a schematic diagram of a system for retrieval of hyphenation data according to the invention.

A data structure of the type described above can be used in a number of ways relating to hyphenation or other types of string parsing. The techniques described below can be used in several frequently occurring hyphenation situations. If a word has already been hyphenated, the data structure can be used to determine whether the word, as hyphenated, is acceptable, as shown in FIG. 4. To hyphenate a word, the data structure can be accessed with the word to retrieve its hyphenation points, as shown in FIG. 5, to permit selection of an acceptable hyphenation point. FIG. 6 shows a system for performing these hyphenation techniques.

1. Hyphenation and Spelling Checking. The routine of FIG. 4 begins by receiving the word being checked, in box 80. The word could be received from a user or could be received as the next word in a text being checked. The routine of FIG. 4 performs hyphenation checking as a part of checking whether the word is on the list from which the data structure was prepared. If the word is on the list and is properly hyphenated or is unhyphenated, the result will be acceptance, but if the word is not on the list or is improperly hyphenated, the result will be non-acceptance. The routine of FIG. 4 thus can also be used for spelling checking.

The test in box 82 determines whether the received word includes any codes, such as character codes or hyphen codes. If not, the step in box 84 returns the final bit of the start state, as shown and described in relation to FIG. 11 of the encoding application. This bit indicates whether or not the empty string is acceptable.

If the word includes at least one code, the step in box 86 goes to the location of the first code's first transition within the data structure, based on a table described in relation to FIG. 11 of the encoding application. Then, the test in box 88 determines whether the code at the current position in the word matches the label at the current location in the data structure. This test, together with the steps that follow, are reiterated until it is determined whether the word, as hyphenated, is acceptable.

If the current code and the label at the current location match, the test in box 90 determines whether the current code is the last code of the word, meaning that all the codes of the word have been matched. If so, the test in box 92 determines whether the final bit of the current location indicates that the word is acceptable. If so, acceptance is returned in box 94. If the current code is not the last code, the test in box 96 determines whether the current location in the data structure has a next location. If so, the routine proceeds in box 98 to the next code in the word and to the next location in the data structure, in box 98.

If the current code and the label at the current location do not match, the test in box 100 determines whether the current location has an alternative. If so, the routine proceeds to the alternative's location, in box 102, and performs the test in box 88 with the current code and the label at the alternative's location.

If the current location matches but does not have a next location, if the current code is the last code in the word but the current location is not final, or if the current location does not match and does not have an alternative, the routine cannot proceed with further matching. The word may still be acceptable, however, because the routine may previously have encountered one or more hyphen codes and may have taken a branch depending from one of those hyphen codes even though that hyphen code did not match a code in the word. If a match is not found in such a branch, the routine should return to the hyphen code that began the branch and take its alternative branch, in case the word can be matched in a branch that depends from a character other than the hyphen. Therefore, the test in box 110 determines whether any hyphenation points are in a stack, discussed in further detail below. If not, non-acceptance is returned in box 112, because there are no further unmatched hyphen codes to return to and the word itself cannot be matched.

If there is a hyphenation point in the stack, the step in box 114 pops the top hyphenation point from the stack, obtaining a hyphenation point's location in the data structure and a position within the word at which that hyphenation point occurs. The routine goes to that location and returns to that position within the word, in box 116. In box 102, the routine goes to the alternative of that location and then returns to the test in box 88, seeking a match.

If, on the other hand, the routine has gone to the next location in box 98, the test in box 120 determines whether the label of this next location is a hyphen code corresponding to a hyphenation point. If not, the routine returns directly to the test in box 88 to seek a match. If the code is a hyphen code, the test in box 122 determines whether the corresponding code in the word is also a hyphen code. If so, a hyphen match has been detected, and the test in box 90 is performed to begin determining whether both the location and the word code can be advanced. But if the corresponding word code is not a hyphen, the word may match by advancing to the location after the hyphen and ignoring the hyphen, or the word may match one of the alternatives to the hyphen branch. The test in box 124 determines whether the location has an alternative. If so, data to enable the routine to return to the hyphenation point is loaded into the stack mentioned above in box 126. This data includes the position of the current code within the word as well as the hyphen's location within the data structure. Whether or not there are alternatives, the location is advanced beyond the hyphen code in box 128 and the routine returns to the test in box 88.

The routine of FIG. 4 thus performs both spell checking and hyphenation checking. It does not, however, retrieve hyphenation information from the data structure. We turn now to techniques that can retrieve more than one hyphenation point of a word, permitting selection of a hyphenation point from those retrieved. The routines described below could also include spell checking and hyphenation checking if the word list on which they operate includes all acceptable words.

2. Hyphenation Point Retrieval. FIG. 5 shows a routine that uses the character codes of a word to retrieve its hyphenation points. Like the routine of FIG. 4, this routine uses a stack for storing hyphenation points encountered during the search. Since the word is unhyphenated, however, all its hyphenation points are unmatched, so that when the search is completed, the stack contains all its acceptable hyphenation points.

The routine of FIG. 5 begins with steps in boxes 140, 142, 144 and 146 that are the same respectively as the steps in boxes 80, 82, 84 and 86 in FIG. 4, except that the word received is unhyphenated. Then, the routine tests in box 148 whether the label at the current location matches the current code of the word. If so, the test in box 150 determines whether that code is the last code of the word. If the code matches and is the last code of the word, the test in box 152 determines whether the current location in the data structure is the final location of an acceptable word. If so, the contents of the hyphenation stack are returned in box 154, indicating each acceptable hyphenation point of the word.

When the matched code is not the last code, the test in box 156 determines whether it has a next location. If so, the routine takes the next code in the word and goes to the next location in the data structure, in box 158. Then it performs further steps discussed below before returning to the test in box 148.

When the current code does not match, the test in box 160 determines whether the current location in the data structure has an alternative location. If so, the routine goes to the alternative location, in box 162, returning to the test in box 148 to determine whether the label at that location matches the current code.

If there is no alternative in box 160, or if the current location is not final in box 152, or if the current location has no next location in box 156, a mismatch has occurred and further searching of the current branch of the data structure is pointless. Therefore, in all these instances, the routine tests in box 170 whether there are any hyphenation points in the stack. If not, the word received in box 140 cannot be matched in the data structure. If the data structure includes an exhaustive list of all acceptable words, the word is not acceptable. But if the data structure includes only those acceptable words that cannot be hyphenated according to some set of hyphenation rules, then the hyphenation rules can be applied to the word. These rules might encode conventional hyphenation principles of general applicability that are likely to provide correct hyphenation points for uncommon words for which accuracy is not important enough to justify including them in the acceptable words of the data structure. The step in box 172 returns an indication that the word's hyphenation points have not been retrieved, and this indication is then used to determine the appropriate subsequent operations. If the routine were being used for spell checking, the returned message in box 172 would indicate that the word is not an acceptable word.

If the stack includes at least one hyphenation point, the step in box 174 pops the top hyphenation point from the stack, and the routine goes to the code position and location in the data structure of that hyphenation point, in box 176. At this point, the routine tests in box 178 whether that hyphenation point has an alternative location. If so, the routine goes to the alternative location in box 162. If not, it returns to determine whether the stack includes further hyphenation points, in box 170.

When the routine goes to a next location in box 158, the test in box 180 determines whether the label at that location is a hyphen code representing a hyphenation point. If so, the current position in the word and the current location in the data structure are pushed onto the stack, as in box 124 in FIG. 4. The routine then goes to the hyphenation point's next location, in box 184, and repeats the test in box 148.

The routine of FIG. 5 is convenient when the characters of a word are available. In some applications, however, a word is represented by a token such as a number, and the word's characters are not explicit in the token. In such instances, a word's characters and hyphenation points can be retrieved from a data structure like that described above using the number corresponding to that word. This is an example of number-to-word mapping. and the technique for such mapping is described in coassigned, copending U.S. patent application Ser. No. 054,462, continued as application Ser. No. 07/563,885, which was in turn continued as application Ser. No. 07/776,909 (referred to herein as "the mapping application"), incorporated herein by reference. The mapping application shows and describes a routine in relation to FIG. 13 that could be used to retrieve a word's characters and hyphenation points from a data structure like that described above based on that word's corresponding number. At the conclusion of that routine, the characters and hyphenation points of the word are stored in a stack, and can be returned for use in subsequent operations.

Figure 5A:
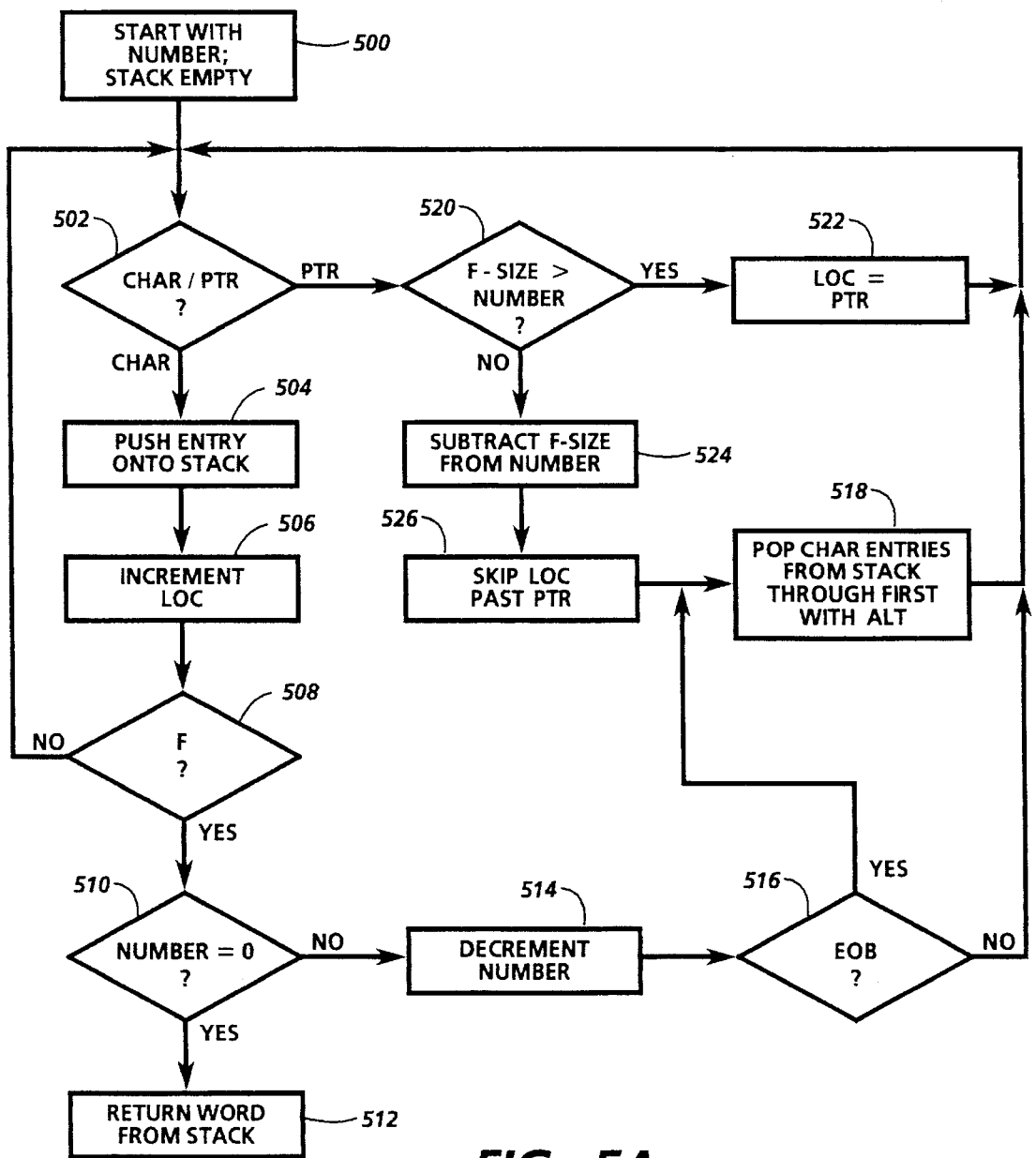

FIG. 5A and the description below provide substantially the same disclosure as FIG. 13 and the description thereof in the mapping application.

FIG. 5A shows a routine for number-to-word (N/W) mapping which is appropriate for a word list stored as described in the mapping application and for the word-to-number (W/N) mapping techniques described in the mapping application. In general, the routine of FIG. 5A scans through a stored word list, decrementing the number to be matched for each byte with set F data. The number reaches zero at the end of the word corresponding to the number being mapped, and that word is then returned.

In FIG. 5A, N/W mapping begins in box 500 with a variable Number and an empty stack. This stack is managed by the routine of FIG. 5A so that it contains the word corresponding to the number being mapped when the routine ends. Therefore, all that is necessary to return the corresponding word is to unload and provide the contents of the stack.

In a simple word list like that of FIG. 2 of the mapping application, it would be feasible to start at the first entry, with Number being the full number being mapped. In a larger word list, however, the number being mapped can be used to directly determine which is the first character of the word based on the first character table, which includes the number corresponding to the word immediately preceding the first word beginning with each character. The number being mapped can be compared with these first character numbers to find the largest one which is less than it, and the difference between the number being mapped and that first character number is the starting value of Number. The current location is then set to the first character transition of the character corresponding to that first character number. But if the number being mapped turned out to be greater than the number corresponding to the last word in the word list, nil is returned. Also, if the number being mapped is zero, the word list is initially tested to determine whether it accepts the null string, and if so the null string is returned. Ordinarily, however, the routine will proceed to the remainder of the routine shown in FIG. 5A.

The test in box 502 determines whether the byte at the current location is a transition unit, i.e. has CHAR data, or is a pointer or pointer index. If it is a transition unit, the byte is pushed onto the stack, in box 504, and the location is incremented in box 506 to proceed to the next location in the FSM. If the test in box 508 determines that the transition unit's F data is set, the test in box 510 determines whether Number is equal to zero. When Number reaches zero, the word in the stack is provided in box 512 and mapping is completed. But if Number is not yet zero, Number is decremented in box 514. The test in box 516 then determines whether the transition unit's EOB data is set. If so, the character entries in the LIFO stack are deleted beginning with the most recently loaded until an entry with its ALT data set is reached, in box 518, because the word being sought does not have its ending in this branch. Then the routine returns to the test in box 502 for the byte at the next location.

If, on the other hand, the byte at the current location is a pointer or a pointer index, the test in box 520 compares the F-size of the branch to which that pointer or pointer index leads with Number. The F-size is either retrieved from its position relative to the pointer or, if the current location has a pointer index, from the lookup table entry corresponding to that index. If the F-size is greater than Number, the location is set in box 522 to the location indicated by the pointer or by the pointer retrieved using the pointer index, because the word sought ends within the branch of the word list which depends from the pointer. The byte at that location is then processed beginning with the test in box 502.

If the F-size is less than or equal to number, it is subtracted from Number in box 524, The routine proceeds in box 526 to the next location after the pointer or pointer index. In addition, the step in box 518 is performed as described above, to pop entries from the stack until one which has its ALT data set is reached. Then the routine returns to the test in box 502.

In returning the word from the stack in box 512, it is necessary to decode the encoded transition units to obtain the corresponding characters. If escape codes were used to encode the characters in the word list, as described above, decoding includes testing for escape codes. When an escape code is found, the number of consecutive escape codes is counted until a code which is not an escape code is found. The number of escape codes together with that code are then used in the character code table to find the output code for the appropriate character, such as an ASCII code.

In order to accelerate number-to-word mapping, the mapping application also shows and describes techniques for including branch skipping information in an FSM data structure in relation to FIGS. 2–10. That additional information permits branch skipping during mapping.

Another number-to-word mapping acceleration technique would be to limit the worst case search time using a block starting point table. Each entry of this table provides the information necessary to start a search at the beginning of a block whose length in word-endings is an arbitrarily selected worst case bound. The entry for each block includes the first word of that block; for each character in the first word that has an alternative transition, the location of the alternative and the number of word endings between that character's transition and its alternative; and, for the last character in the first word, its location or its next transition's location if it has a next transition.

A number N being mapped is first divided by the worst case bound B and the quotient is used to access the table entry of the block containing the Nth word. To simplify division, B is preferably a power of two. The remainder R is then used with the data in the entry for that block to reach an appropriate starting point within the block. R is compared successively with the number of word endings for each character in the first word. If R is less, that character is retained in a stack and the next character is compared, but if R is greater, the Nth word must depend from the alternative of that character and further comparison with the characters in the entry is unnecessary. Therefore, if R is less than all the numbers of word endings, number-to-word mapping begins with all the characters in the entry as a prefix, with the location of the last character or its next location as the current location and with R as the residual count. But when the first character is found with a number of word endings greater than R, number-to-word mapping begins with only the preceding characters as a prefix, with the alternative location of that character as the current location and with R minus that character's number of word endings as the residual count.

The block starting point table can be created by performing number-to-word mapping on each integer multiple M of B, obtaining and storing the relevant information along the way. For each character of the corresponding word except the last, the relevant information includes the location of its alternative transition, if any, and the difference between M and the number corresponding to the first complete word encountered after taking the alternative. This difference, which corresponds to the number of word endings in the branch depending from that character, may be obtained as described in the mapping application in relation to branch skipping information. For the last character, the relevant information includes its location or its next location. Conventional encoding techniques can be used to make the block starting point table as compact as possible.

Conversely, the routines of FIGS. 4 and 5 can include word-to-number mapping. If branch skipping information is included in the FSM data structure with the hyphenation point data in accordance with the mapping application, the routine of FIGS. 11 and 12 of the mapping application can perform word-to-number mapping with that data structure if modified to treat hyphen codes appropriately in accordance with the appropriate one of FIGS. 4 and 5.

We turn now to a system for performing hyphenation checking or hyphenation point retrieval.

4. Hyphenation System.

FIG. 6 shows a system for performing hyphenation operations using the data structure described above. System 200 is centered around CPU 202, that receives input signals through input buffer 204 and provides output signals through output buffer 206. CPU 202 executes instructions from program memory 210, and operates on data stored in data memory 230, including data structure 232 that includes hyphenation data as described above.

Program memory 210 could, for example, include read-only memory (ROM) storing code for execution by CPU 202. FIG. 6 shows some exemplary routines and subroutines, but program memory 210 would also contain other conventional routines and subroutines appropriate to its operations. Justification routine 212 could be a conventional routine that inserts line breaks in text based on hyphenation points, and it could retrieve all hyphenation points from data structure 232 or it could treat data structure 232 as an exception list, in which case justification routine 212 could call another conventional subroutine (not shown) for providing rule-based hyphenation points for words not included in data structure 232. If operating on text in the form of words, justification routine 212 could retrieve hyphenation points using word-based retrieval subroutine 230, but if operating on text in the form of numbers serving as tokens, justification routine 212 could retrieve hyphenation points using number-based retrieval subroutine 232.

Word mode routine 214 could be a routine that can be called by another routine to perform hyphenation checking or retrieval for a single word provided by the other routine. This could be used, for example, if another routine receives a word from a user together with a user request to check the word's hyphenation or retrieve its hyphenation points. In response, word mode routine 214 would call the appropriate subroutine based on the type of the request and, when the subroutine was complete, would return the appropriate data concerning that word.

Batch mode routine 216 could be a routine that can be called by another routine to perform hyphenation checking or retrieval for text including a number of words. Batch mode routine 216 would be useful, for example, for checking the hyphenation of an entire document or for converting a document whose words are represented by numbers into a document of words expressed in characters with hyphenation points. Batch mode routine 216 would use batch mode store 234 to store the document being processed and to store the results of checking or retrieval.

Hyphenation checking subroutine 218 can be implemented in accordance with FIG. 4. Word-based retrieval subroutine 220 can be implemented in accordance with FIG. 5, and can make use of stack memory 236 to store the stack of hyphenation points. Number-based retrieval subroutine 222 can be implemented in accordance with FIG. 13 of the mapping application, and can make use of stack memory 236 to store the stack of characters and hyphenation points. All the routines and subroutines can make use of registers 238 and other storage areas in data memory 230 as necessary.

D. Miscellaneous

The invention could be implemented with a wide variety of data structures. The use of an FSM data structure facilitates determinizing and minimizing, but other types of data structures, including other types of directed graphs, can similarly be collapsed to reduce redundant data. The techniques of the invention can also be applied selectively to parts of a data structure rather than to the entirety.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a processor comprising:

operating the processor to produce word data representing a large set of words; the large set of words including a set of shared suffix branches, each shared suffix branch occurring at least twice in the large set of words; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches; the shared suffix following a first word character in the first word and following a second word character in the second word; the word data including codes; the codes including character codes representing characters of the words; the act of operating the processor to produce word data comprising:

including a hyphenation code representing the hyphenation point of the first word in the word data; the word data being searchable for a first sequence of the codes and a second sequence of the codes; the first sequence representing the first word and including a preceding one of the character codes representing the preceding character, a following one of the character codes representing the subsequent character, the hyphenation code, and a first word character code representing the first word character; the second sequence of the codes representing the second word; the second sequence of codes including a second word character code representing the second word character; the act of including the hyphenation code comprising:

positioning the hyphenation code between the preceding character code and the following character code in the first code sequence so that the hyphenation point of the first word can be determined from the position of the hyphenation code; and collapsing the word data so that the first sequence of codes and the second sequence of codes both include shared suffix codes; the shared suffix codes representing the shared suffix in both the first word and the second word; the act of collapsing the word data comprising:

detecting each of the set of shared suffix branches; and for each shared suffix branch detected, determining whether to represent the shared suffix branch only once; the act of collapsing the word data determining to represent the first shared suffix branch only once; and storing the collapsed word data in a memory so that the shared suffix codes begin at a first location in the memory, so that the first sequence of codes includes information that a processor can use, after accessing the first word character code, to continue search by accessing the shared suffix codes at the first location, and so that the second sequence of codes includes information that a processor can use, after accessing the second word character code, to continue search by accessing the shared suffix codes at the first location; the act of storing the collapsed word data comprising:

for the shared suffix branches determined to be represented only once, including location codes in the collapsed word data, each location code indicating a location in the memory at which a shared suffix branch is represented; at least one of the first and second word character codes being followed by a first one of the location codes; the first location code indicating the first location so that the processor can use the first location code to continue search by accessing the shared suffix codes at the first location.

2. A system comprising: memory for storing data; the data stored in memory comprising word data representing a large set of words; the large set of words including a set of shared suffix branches, each shared suffix branch occurring at least twice in the large set of word; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches; the shared suffix following a first word character in the first word and following a second word character in the second word; and a processor connected for accessing the word data to determine the hyphenation point of the first word;

the word data including codes, each code being one of a set of codes that includes character codes for representing characters of words, location codes for indicating locations in the memory, and a hyphenation code for representing hyphenation points of words;

the word data comprising:

a first sequence of codes representing the first word; the first sequence of codes including a preceding character code representing the preceding character, a following character code representing the subsequent character, a first word hyphenation code representing the hyphenation point of the first word, and a first word character code representing the first word character; the first word hyphenation code being positioned between the preceding character code and the following character code in the first sequence of codes so that the processor can determine the hyphenation point of the first word from the position of the hyphenation code; and a second sequence of codes representing the second word; the second sequence of codes including a second word character code representing the second word character;

the first sequence of codes and the second sequence of codes both including shared suffix codes; the shared suffix codes representing the shared suffix in both the first word and the second word as a result of an operation that detects each of the set of shared suffix branches and determines, for each detected shared suffix branch, whether to represent it only once; the shared suffix codes beginning at a first location in the memory;

the first sequence of codes including information that the processor can use, after accessing the first word character code, to continue search by accessing the shared suffix codes at the first location; the second sequence of codes including information that the processor can use, after accessing the second word character code, to continue search by accessing the shared suffix codes at the first location; at least one of the first and second word character codes being followed by a first location code indicating the first location so that the processor can use the first location code to continue search by accessing the shared suffix codes at the first location;

the processor being operable to search the word data for the first sequence of codes and to determine the hyphenation point of the first word from the position of the hyphenation code in the first sequence of codes.

3. The system of claim 2 in which the processor is operable for accessing the word data based on the characters of the first word to retrieve the hyphenation code.

4. The system of claim 2 in which the processor is operable for accessing the word data with a token to obtain the first word and to retrieve the hyphenation code.

5. An article of manufacture for use in a system that includes a processor for accessing data in the article;

the article comprising:

memory for storing data; and word data stored in the memory, the word data representing a large set of words; the large set of words including a set of shared suffix branches, each shared suffix branch occurring at least twice in the large set of words; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches; the shared suffix following a first word character in the first word and following a second word character in the second word;

the word data including codes, each code being one of a set of codes that includes character codes for representing characters of words, location codes for indicating locations in the memory, and a hyphenation code for representing hyphenation points of words;

the word data comprising:

a first sequence of codes representing the first word; the first sequence of codes including a preceding character code representing the preceding character, a following character code representing the subsequent character, a first word hyphenation code representing the hyphenation point of the first word, and a first word character code representing the first word character; the first word hyphenation code being positioned between the preceding character code and the following character code in the first sequence of codes so that the processor can access the word data, search for the first sequence of codes, and determine the hyphenation point of the first word from the position of the hyphenation code in the first sequence of codes; and a second sequence of codes representing the second word; the second sequence of codes including a second word character code representing the second word character;

the first sequence of codes and the second sequence of codes both including shared suffix codes; the shared suffix codes representing the shared suffix in both the first word and the second word as a result of an operation that detects each of the set of shared suffix branches and determines, for each detected shared suffix branch, whether to represent it only once; the shared suffix codes beginning at a first location in the memory;

the first sequence of codes including information that the processor can use, after accessing the first word character code, to continue search by accessing the shared suffix codes at the first location; the second sequence of codes including information that the processor can use, after accessing the second word character code, to continue search by accessing the shared suffix codes at the first location; at least one of the first and second word character codes being followed by a first location code indicating the first location so that the processor can use the first location code to continue search by accessing the first shared suffix codes at the first location.

6. A method of using the article of claim 5 comprising:

operating a processor to access the word data based on the characters of the first word to retrieve the hyphenation code.

7. The method of claim 6 in which the first word has a second hyphenation point different from the first above-mentioned hyphenation point, the word data including a second hyphenation code representing the second hyphenation point in addition to the first above-mentioned hyphenation code, the accessing step comprising retrieving both the first and second hyphenation codes.

8. The method of claim 7, further comprising determining where to hyphenate the first word based on the retrieved first and second hyphenation codes.

9. A method of using the article of claim 5 comprising:

operating a processor to access the word data based on a hyphenation of the first word to determine whether the first word is hyphenated at the hyphenation point.

10. The method of claim 9, further comprising determining whether the first word is correctly hyphenated.

11. A method of using the article of claim 5 comprising:

operating a processor to access the word data with a token to obtain the first word and to retrieve the hyphenation code.

12. A method of operating a system that includes:

memory for storing data; the data stored in memory comprising word data representing a large set of words; the large set of words including a set of shared suffix branches, each shared suffix branch occurring at least twice in the large set of words; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches; the shared suffix following a first word character in the first word and following a second word character in the second word; and a processor connected for accessing the word data to determine the hyphenation point of the first word;

the word data including codes, each code being one of a set of codes that includes character codes for representing characters of words, location codes for indicating locations in the memory, and a hyphenation code for representing hyphenation points of words;

the word data comprising:

a first sequence of codes representing the first word; the first sequence of codes including a preceding character code representing the preceding character, a following character code representing the subsequent character, a first word hyphenation code representing the hyphenation point of the first word, and a first word character code representing the first word character; the first word hyphenation code being positioned between the preceding character code and the following character code in the first sequence of codes so that the processor can determine the hyphenation point of the first word from the position of the hyphenation code; and a second sequence of codes representing the second word; the second sequence of codes including a second word character code representing the second word character;

the first sequence of codes and the second sequence of codes both including shared suffix codes; the shared suffix codes representing the shared suffix in both the first word and the second word as a result of an operation that detects each of the set of shared suffix branches and determines, for each detected shared suffix branch, whether to represent it only once the shared suffix codes beginning at a first location in the memory;

the first sequence of codes including information that the processor can use, after accessing the first word character code, to continue search by accessing the shared suffix codes at the first location; the second sequence of codes including information that the processor can use, after accessing the second word character code, to continue search by accessing the shared suffix codes at the first location; at least one of the first and second word character codes being followed by a first location code indicating the first location so that the processor can use the first location code to continue search by accessing the shared suffix codes at the first location;

the method comprising steps of:
  operating the processor to search the word data for the first sequence of codes; and
  operating the processor to determine the hyphenation point of the first word from the position of the first word hyphenation code in the first sequence of codes.

13. A method of operating a processor comprising:

operating the processor to produce word data representing a large set of words; the large set of words including a set of shared suffix branches, each shared suffix branch occurring at least twice in the large set of words; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches and a shared prefix; the shared suffix following a first word character in the first word and following a second word character in the second word; the word data including codes; the codes including:
  character codes representing characters of the words; and
  a hyphenation code representing the hyphenation point of the first word;

the word data being searchable for a first sequence of the codes and for a second sequence of the codes; the first sequence representing the first word and including a preceding one of the character codes representing the preceding character, a following one of the character codes representing the subsequent character, the hyphenation code, and a first word character code representing the first word character; the second sequence of the codes representing the second word; the second sequence of codes including a second word character code representing the second word character; the hyphenation code being positioned between the preceding character code and the following character code in the first sequence so that the hyphenation point of the first word can be determined from the position of the hyphenation code;

operating the processor to use the word data to obtain stored word data stored in a memory; the stored word data including:
  shared prefix codes that represent the shared prefix once for its occurrences in the first and second words; the first and second sequences of codes both including the shared prefix codes;
  shared suffix codes that begin at a first location in the memory; the shared suffix codes representing the shared suffix once for its occurrences in the first and second words; the first sequence of codes including information that a processor can use, after accessing the first word character code, to continue search by accessing the shared suffix codes at the first location; the second sequence of codes includes information that a processor can use, after accessing the second word character code, to continue search by accessing the shared suffix codes at the first location;

the act of operating the processor to use the word data to obtain stored word data comprising:
  detecting each of the set of shared suffix branches;
  for each shared suffix branch detected, determining whether to represent the shared suffix branch only once; the act of operating the processor to use the word data to obtain stored word data determining to represent the first shared suffix branch only once; and
  for the shared suffix branches determined to be represented only once, including location codes in the stored word data, each location code indicating a location in the memory at which a shared suffix branch is represented; at least one of the first and second word character codes being followed by a first one of the location codes; the first location code indicating the first location so that a processor can use the first location code to continue search by accessing the shared suffix codes at the first location;

the hyphenation code having a position in the stored word data so that the hyphenation point of the first word can be determined from the position of the hyphenation code in the stored word data.

14. The method of claim 13 in which the shared prefix ends with the preceding character that precedes the hyphenation point in the first word; the second word having an alternative character immediately following the preceding character and having no hyphenation point between the preceding character and the alternative character; the act of operating the processor to use the word data to obtain stored word data further comprising:
  positioning the hyphenation code and an alternative character code representing the alternative character at positions within the stored word data so that the alternative character code can be reached from the hyphenation code.

15. The method of claim 14 in which the stored word data include a searchable branch that includes the hyphenation code and the following character code, the position of the hyphenation code being before the position of the alternative character code so that a search of the branch can continue to the alternative character code.

16. The method of claim 13 in which the second word has a hyphenation point between the preceding character and the subsequent character, the hyphenation point of the second word being a point at which the second word can properly be hyphenated; the preceding character and the subsequent character each being within the shared prefix or the shared suffix, one of the shared prefix codes and the shared suffix codes including the hyphenation code.

17. A system comprising:
  memory for storing data; the data stored in memory comprising:
    word data representing a large set of words; the large set of words including a set of shared suffix branches, each shared suffix branch occurring at least twice in the large set of words; a first one of the words having two or more characters and a hyphenation point between a preceding character and a subsequent character; the hyphenation point of the first word being a point at which the first word call properly be hyphenated; the first word and a second one of the words in the large set both including a shared suffix that occurs in a first one of the shared suffix branches; the shared suffix following a first word character in the first word and following a second word character in the second word; and
    instruction data indicating instructions;

a processor connected for accessing the data stored in memory;

the word data including codes, each code being one of a set of codes that includes character codes for representing characters of words, location codes for indicating locations in the memory, and a hyphenation code for representing hyphenation points of words;

the word data comprising:

a first sequence of codes representing the first word; the first sequence of codes including a preceding character code representing the preceding character, a following character code representing the subsequent character, a first word hyphenation code representing the hyphenation point of the first word, and a first word character code representing the first word character; the first word hyphenation code being positioned between the preceding character code and the following character code in the first sequence of codes so that the processor can determine the hyphenation point of the first word from the position of the hyphenation code; and a second sequence of codes representing the second word; the second sequence of codes including a second word character code representing the second word character;

the first sequence of codes and the second sequence of codes both including shared suffix codes; the shared suffix codes representing the shared suffix in both the first word and the second word as a result of an operation that detects each of the set of shared suffix branches and determines, for each detected shared suffix branch, whether to represent it only once; the shared suffix codes beginning at a first location in the memory;

the first sequence of codes including information that the processor can use, after accessing the first word character code, to continue search by accessing the shared suffix codes at the first location; the second sequence of codes including information that the processor can use, after accessing the second word character code, to continue search by accessing the shared suffix codes at the first location; at least one of the first and second word character codes being followed by a first location code indicating the first location so that the processor can use the first location code to continue search by accessing the shared suffix codes at the first location;

the instruction data indicating instructions the processor can execute to determine the hyphenation point of the first word; the processor, in executing the instructions:

obtaining the first sequence of codes representing the first word;

searching the word data for the first sequence of codes; and determining the hyphenation point of the first word from the position of the hyphenation code in the first sequence of codes.

18. An article of manufacture for use in a system that includes a processor for accessing data in the article;

the article comprising:

memory for storing data; the data stored in memory comprising:

word data representing a large set of words; the large set of words including a set of shared suffix branches, each shared suffix branch occurring at least twice in the large set of words; a first one of the words in the large set having two or more characters and a hyphenation point between a preceding character and a subsequent character; the hyphenation point of the first word being a point at which the first word can properly be hyphenated; the first word and a second one of the words in the large set both including a shared suffix that occurs in a first one of the shared suffix branches; the shared suffix following a first word character in the first word and following a second word character in the second word; and instruction data indicating instructions the processor can execute;

the word data including codes, each code being one of a set of codes that includes character codes for representing characters of words, location codes for indicating locations in the memory, and a hyphenation code for representing hyphenation points of words;

the word data comprising:

a first sequence of codes representing the first word; the first sequence of codes including a preceding character code representing the preceding character, a following character code representing the subsequent character, a first word hyphenation code representing the hyphenation point of the first word, and a first word character code representing the first word character; the first word hyphenation code being positioned between the preceding character code and the following character code in the first sequence of codes so that the processor can determine the hyphenation point of the first word from the position of the hyphenation code; and a second sequence of codes representing the second word; the second sequence of codes including a second word character code representing the second word character;

the first sequence of codes and the second sequence of codes both including shared suffix codes; the shared suffix codes representing the shared suffix in both the first word and the second word as a result of an operation that detects each of the set of shared suffix branches and determines, for each detected shared suffix branch, whether to represent it only once; the shared suffix codes beginning at a first location in the memory;

the first sequence of codes including information that the processor can use, after accessing the first word character code, to continue search by accessing the shared suffix codes at the first location; the second sequence of codes including information that the processor can use, after accessing the second word character code, to continue search by accessing the shared suffix codes at the first location; at least one of the first and second word character codes being followed by a first location code indicating the first location so that the processor can use the first location code to continue search by accessing the first shared suffix codes at the first location;

the instruction data indicating instructions the processor can execute to determine the hyphenation point of the first word; the processor, in executing the instructions:

obtaining the first sequence of codes representing the first word;

searching the word data for the first sequence of codes; and determining the hyphenation point of the first word from the position of the hyphenation code in the first sequence of codes.

19. An article of manufacture for use in a system that includes a processor for accessing data in the article; the article comprising:

memory for storing data; and word data stored in the memory; the word data representing a large set of words; the large set of words including a set of shared suffix branches, each shared suffix branch occurring at least twice in the large set of words; first, second, and third ones of the words in the large set each having two or more characters; the first word having a hyphenation point between a hyphen-preceding character and a hyphen-subsequent character; the hyphenation point of the first word being a point at which the first word can properly be hyphenated; the second word not being properly hyphenated after the hyphen-preceding character; the first and second words both including a shared prefix that ends with the hyphen-preceding character; the second word further having a hyphen-alternative character following the hyphen-preceding character; the first and third words both including a shared suffix; the shared suffix following a first word character in the first word and a third word character in the third word; the first word character following the hyphen-subsequent character in the first word;

the word data comprising codes positioned in a sequence for search by the processor; each code in the sequence being one of a set of codes that includes character codes for representing characters of words, location codes for indicating locations in the memory, and a hyphenation code for representing hyphenation points of words;

the codes positioned in the sequence comprising:

shared prefix codes; the shared prefix codes representing the shared prefix in both the first word and the second word; the shared prefix codes ending with a shared prefix ending code;

a first word hyphenation code representing the hyphenation point of the first word;

a following character code representing the hyphen-subsequent character;

an alternative character code representing the hyphen-alternative character;

a first word character code representing the first word character;

a third word character code representing the third word character;

shared suffix codes; the shared suffix codes representing the shared suffix in both the first word and the third word as a result of an operation that detects each of the set of shared suffix branches and determines, for each detected shared suffix branch, whether to represent it only once; the shared suffix codes beginning at a first location in the memory; and after at least one of the first word character code and the third word character code, a first location code indicating the first location in the memory so that the processor can continue search by accessing the shared suffix codes at the first location;

the first word hyphenation code following the shared prefix ending code in the sequence so that the processor, in searching, can continue from the shared prefix ending code to the first word hyphenation code; the following character code following the first word hyphenation code in the sequence so that the processor, in searching, can continue from the first word hyphenation code to the following character code; and the alternative character code following the first word hyphenation code in the sequence so that the processor, in searching, can continue from the first word hyphenation code to the alternative character code.

20. The article of claim 19 in which the word data is a determinized and minimized FSM data structure.

21. The article of claim 19 in which the shared prefix includes the hyphen-preceding character; the second word having a hyphenation point following the hyphen-preceding character, the hyphenation point of the second word being a point at which the second word can properly be hyphenated; the hyphenation code being positioned so that the shared prefix codes include the hyphenation code.

22. The article of claim 19 in which the shared suffix includes the hyphen-subsequent character; the second word having a hyphenation point preceding the hyphen-subsequent character, the hyphenation point of the second word being a point at which the second word can properly be hyphenated; the hyphenation code being positioned so that the shared suffix codes include the hyphenation code.

23. The article of claim 19 in which the shared prefix ends with the hyphen-preceding character, the shared suffix begins with the hyphen-subsequent character, and the hyphenation point is not within either the shared prefix or the shared suffix; the hyphenation code being positioned so that it is not included in either the shared prefix codes or the shared suffix codes.

24. An article of manufacture for use in a system that includes a processor for accessing data in the article; the article comprising:

memory for storing data; and word data stored in the memory; the word data representing a large set of words; the large set of words including a set of shared suffix branches, each shared suffix branch occurring at least twice in the large set of words; first and second ones of the words in the large set each having two or more characters; the first word having a hyphenation point between a hyphen-preceding character and a hyphen-subsequent character; the hyphenation point of the first word being a point at which the first word can properly be hyphenated; the first and second words both including a shared suffix; the shared suffix following a first word character in the first word and a second word character in the second word;

the word data comprising codes positioned in a sequence for search by the processor; each code in the sequence being one of a set of codes that includes character codes for representing characters of words, location codes for indicating locations in the memory, and a hyphenation code for representing hyphenation points of words;

the codes positioned in the sequence comprising:

a preceding character code representing the hyphen-preceding character;

a first word hyphenation code representing the hyphenation point of the first word;

a following character code representing the hyphen-subsequent character; the first word hyphenation code being positioned after the preceding character code and before the following character code in the sequence so that a processor can determine the hyphenation point of the first word from the position of the first word hyphenation code;

a first word character code representing the first word character;

a second word character code representing the second word character;

shared suffix codes; the shared suffix codes representing the shared suffix in both the first word and the second word as a result of an operation that detects each of the set of shared suffix branches and determines, for each detected shared suffix branch, whether to represent it only once; the shared suffix codes beginning at a first location in the memory; and after at least one of the first word character code and the second word character code, a first location code indicating the first location in the memory so that the processor can continue search by accessing the shared suffix codes at the first location.

* * * * *